United States Patent
Kent

(10) Patent No.: US 11,216,140 B2
(45) Date of Patent: Jan. 4, 2022

(54) PCAP TOUCHSCREENS WITH VARYING ITO DICING PATTERNS

(71) Applicant: Elo Touch Solutions, Inc., Milpitas, CA (US)

(72) Inventor: Joel C. Kent, Fremont, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 0 days.

(21) Appl. No.: 16/822,719

(22) Filed: Mar. 18, 2020

(65) Prior Publication Data

US 2020/0333921 A1 Oct. 22, 2020

Related U.S. Application Data

(60) Provisional application No. 62/834,817, filed on Apr. 16, 2019.

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0446* (2019.05); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2009/0315854 A1* | 12/2009 | Matsuo | ............ | G06F 3/0443 345/174 |
| 2009/0322704 A1* | 12/2009 | Anno | ............ | G06F 3/045 345/174 |
| 2013/0168138 A1* | 7/2013 | Yamazaki | ............ | G06F 3/0446 174/253 |
| 2018/0024665 A1* | 1/2018 | Kent | ............ | G06F 3/0445 345/174 |
| 2019/0258338 A1* | 8/2019 | Park | ............ | G06F 3/044 |
| 2019/0346973 A1* | 11/2019 | Kira | ............ | G06F 3/04164 |

* cited by examiner

*Primary Examiner* — Sanghyuk Park
(74) *Attorney, Agent, or Firm* — Sterne, Kessler, Goldstein & Fox P.L.L.C.

(57) ABSTRACT

Embodiments include a method and system for projected capacitive (PCAP) touchscreen construction with laser ablation. In glass/film/film (GFF) PCAP touchscreens, the films are coated with indium-tin-oxide (ITO), patterned by printing silver ink, and by ablating both the ITO and silver with a laser. A similar process occurs for a glass/glass (2GS) PCAP touchscreen. Embodiments include varying the pattern with which the laser ablates ITO on film within the touch area to improve touchscreen sensitivity. For example, by varying the width of patterns of floating ITO islands such that widths are less than or equal to a plan-view electrode gap between vertical and horizontal electrode pads and larger elsewhere, the touch sensitivity of the PCAP touchscreen may be improved and/or maximum touchscreen size may be increased.

20 Claims, 16 Drawing Sheets

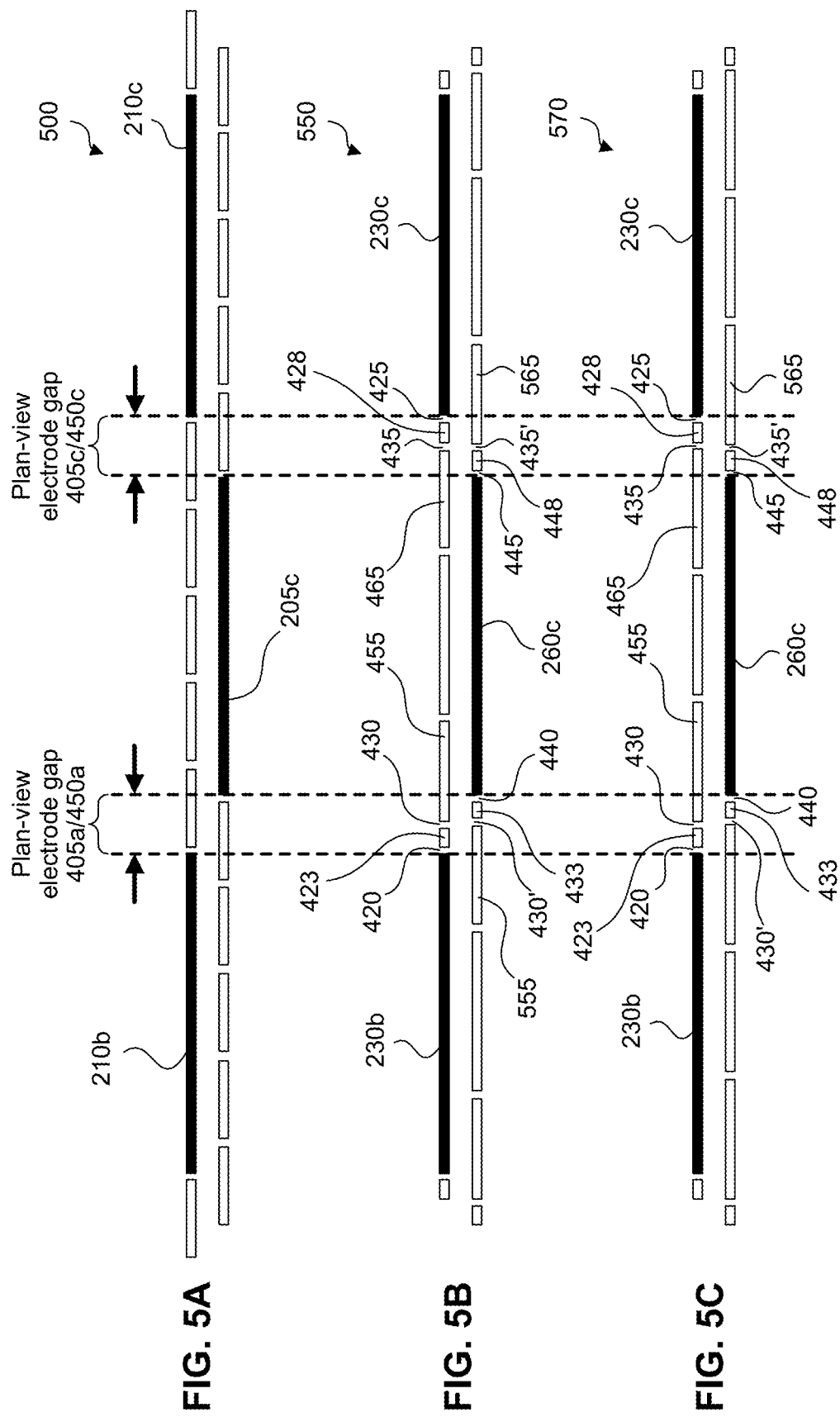

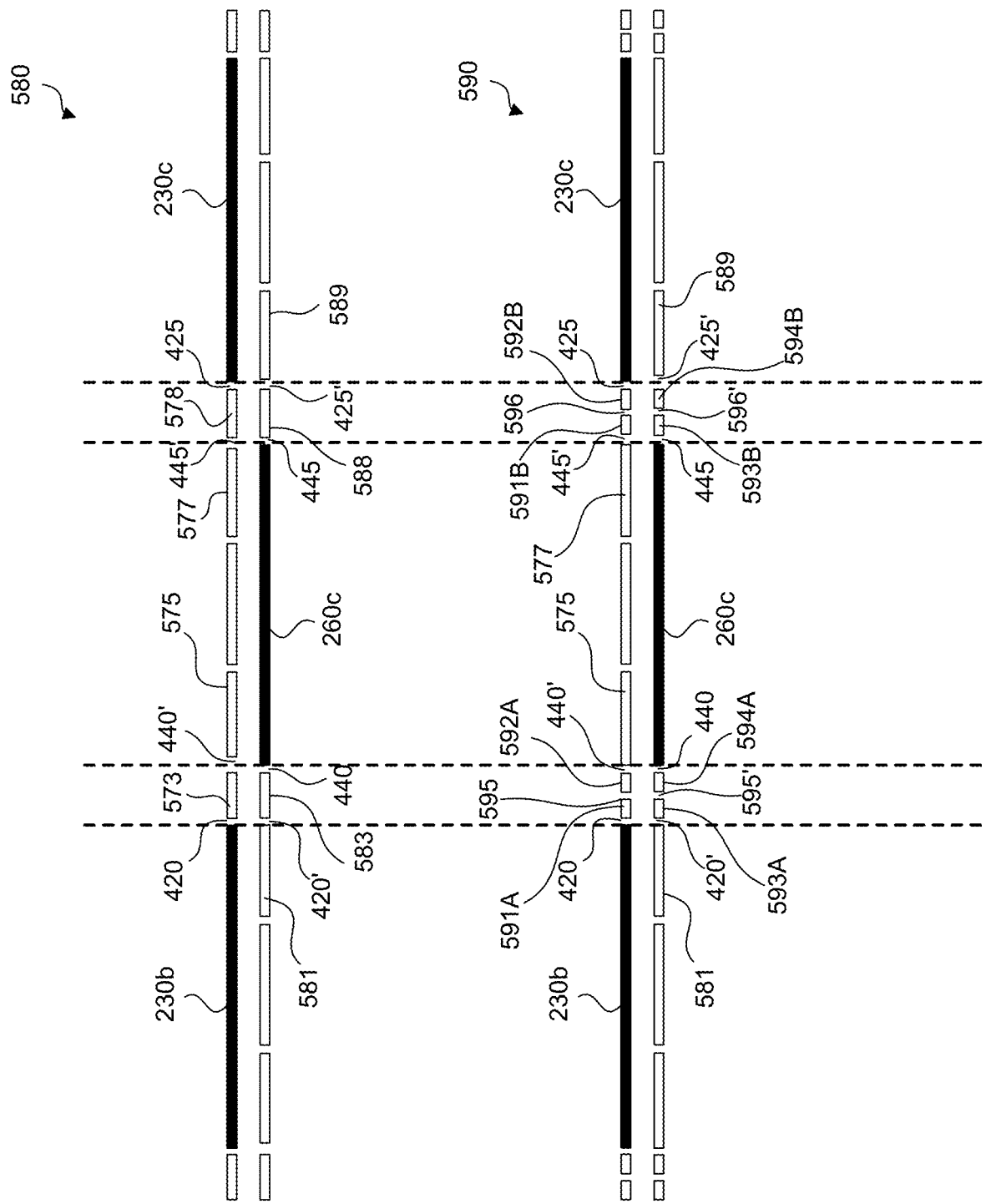

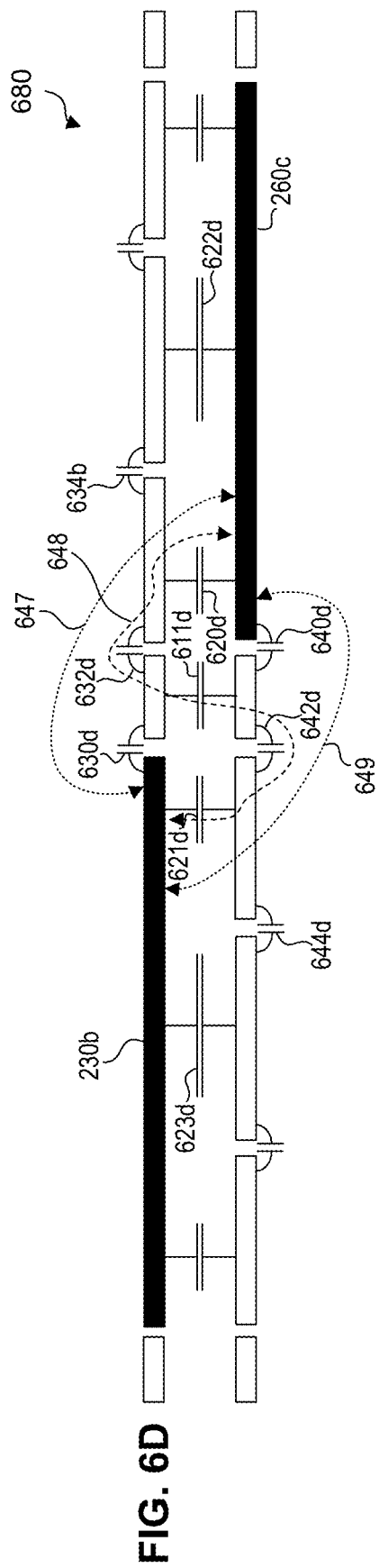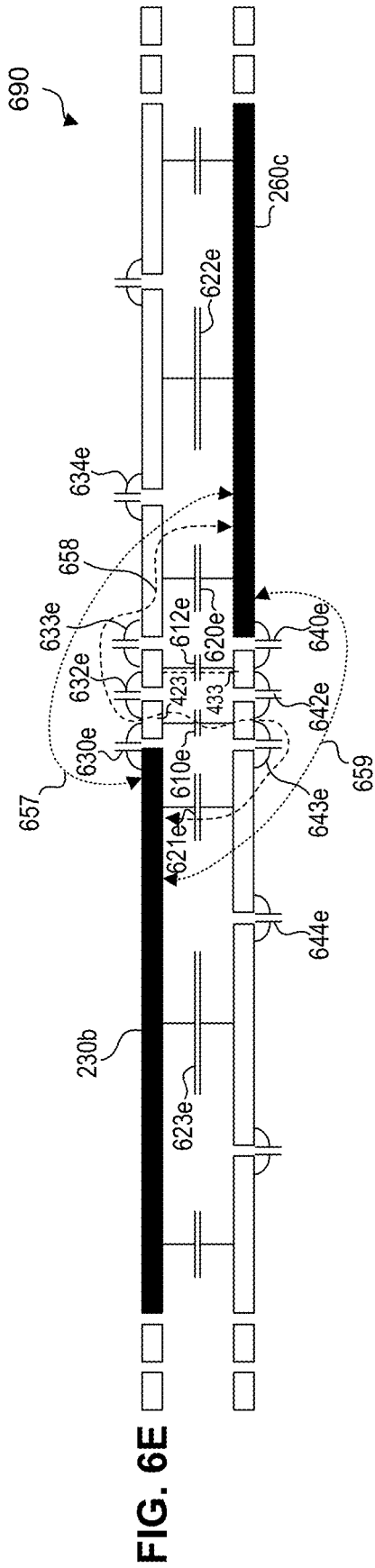
FIG. 6D
FIG. 6E

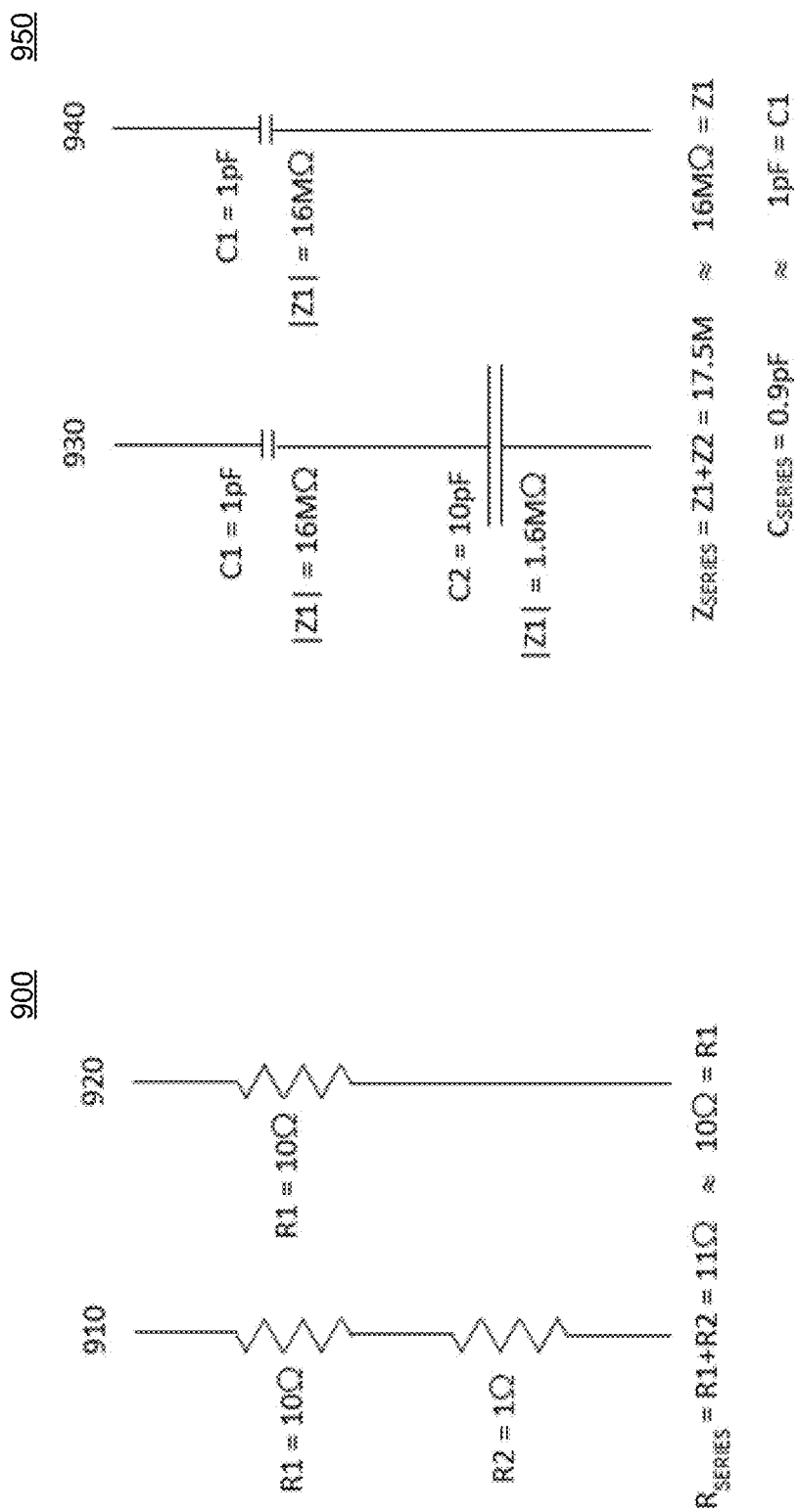

PCAP TOUCHSCREENS WITH VARYING ITO DICING PATTERNS

CROSS-REFERENCE TO RELATED APPLICATIONS

This application claims benefit of U.S. Application No. 62/834,817, filed on Apr. 16, 2019, entitled, PCAP Touchscreens with Varying ITO Dicing Patterns, which is incorporated herein by reference in its entirety.

BACKGROUND

Field

The present disclosure relates generally to Projected capacitive (PCAP) touch sensitive systems, and more specifically to the dicing patterns on indium-tin-oxide (ITO) of PCAP touchscreens.

Background Art

The ability to interact with computer applications via touch with displays is ubiquitous for today's consumers. While several touch technologies are possible to support touch interactions, each has advantages and disadvantages that tailor each for particular environments, sizes, and applications. Projected capacitive (PCAP) technology is commonly utilized to support characteristics expected from touch interactions in touch/display interface devices.

A typical approach to using lasers to ablate indium-tin-oxide (ITO) for a PCAP touchscreen includes uniform patterns on the ITO. But the uniform patterns contribute to increasing a baseline mutual capacitance, $C_M$, that reduces touch sensitivity of the PCAP touchscreen.

SUMMARY

System, method, combination, sub-combination and other embodiments are provided for glass/film/film (GFF) and/or glass/glass (2GS) projected capacitive (PCAP) touchscreens and their construction. In a GFF PCAP touchscreen, the films are coated with indium-tin-oxide (ITO) or equivalent, patterned by printing silver ink, and both the ITO and silver are ablated with a laser. Any transparent conductive film, such as silver-nanowire coating, that can be laser ablated is considered to be an equivalent to ITO. In the descriptions that follow, it is to be understood that "ITO" is shorthand for "ITO or equivalent". Similarly, in a 2GS PCAP touchscreen the ITO on the glass is patterned by printing silver ink, and by ablating both the ITO and silver with the laser. Embodiments include varying the pattern with which the laser ablates ITO on film (or glass) within the touch area to improve touchscreen sensitivity. For example, by varying the width of floating ITO islands such that widths are less than or equal to a plan-view electrode gap between vertical and horizontal electrode pads and larger elsewhere, the touch sensitivity of the PCAP touchscreen may be improved and/or maximum touchscreen size may be increased.

Some embodiments include a projected capacitive (PCAP) touchscreen that includes two transparent electrodes. The first transparent electrode includes a vertical electrode pad and a first floating ITO island. The second transparent electrode is parallel to the first transparent electrode, and includes a horizontal electrode. The vertical electrode pad is separated from the horizontal electrode by a plan-view electrode gap, and a dimension of the first floating ITO island is less than or equal to the plan-view electrode gap. Embodiments also include a method for fabricating a projected capacitive (PCAP) touchscreen by disposing a first transparent electrode including a vertical electrode pad on a first layer, and disposing a second transparent electrode including a horizontal electrode on a second layer that is parallel to the first transparent electrode, where the vertical electrode pad is separated from the horizontal electrode by a plan-view electrode gap. Embodiments also include creating via laser ablation, a first floating ITO island on the first transparent electrode, where a dimension of the first floating ITO island is about equal to or less than the plan-view electrode gap. The dimension may be a width, for example.

In some embodiments, the second transparent electrode includes a second floating ITO island, and some embodiments include: establishing a first laser ablation line between the first floating ITO island and a first neighboring floating ITO island of the first transparent electrode, where the first floating ITO island is most proximate to the vertical electrode pad; and establishing a second laser ablation line between the second floating ITO island and a second neighboring floating ITO island of the second transparent electrode, where the second floating ITO island is most proximate to the horizontal electrode pad. In some embodiments, the first and the second laser ablation lines are centered within the plan-view electrode gap. In some embodiments, the first laser ablation line is not aligned with the second laser ablation line within the plan-view electrode gap. In some embodiments, the first floating ITO island is smaller than one or more floating ITO islands of the first transparent electrode. Further, one or more floating ITO islands of the first transparent electrode may vary in length. In some embodiments, the one or more floating ITO islands of the first transparent electrode are substantially equivalent in length.

When the dimension of the first floating ITO island is based on a varying ITO dicing pattern, some embodiments include a first signal path from the vertical electrode pad to the horizontal electrode pad via the first floating ITO island, where the first signal path includes at least one high-impedance edge-to-edge capacitance or one high-impedance small-area capacitance, where the first signal path has a lower impedance than a second signal path from the vertical electrode pad to the horizontal electrode pad via a second floating ITO island of the first transparent electrode, where the second floating ITO island is based on a uniform ITO dicing pattern. In some embodiments, the varying ITO dicing pattern of the first floating ITO island causes a reduction in a value of mutual capacitance, $C_M$, between the vertical electrode and the horizontal electrode. In some embodiments, the varying ITO dicing pattern of the first floating ITO island causes a reduction in the PCAP touchscreen RC settling time and an increase in touch sensitivity, $\Delta C_M/C_M$.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 5A illustrates an exemplary example of a vertical cross section of a uniform ITO dicing pattern;

FIG. 5B illustrates an exemplary example of vertical cross section of a varying ITO dicing pattern, according to an exemplary embodiment of the disclosure;

Figure 6A:
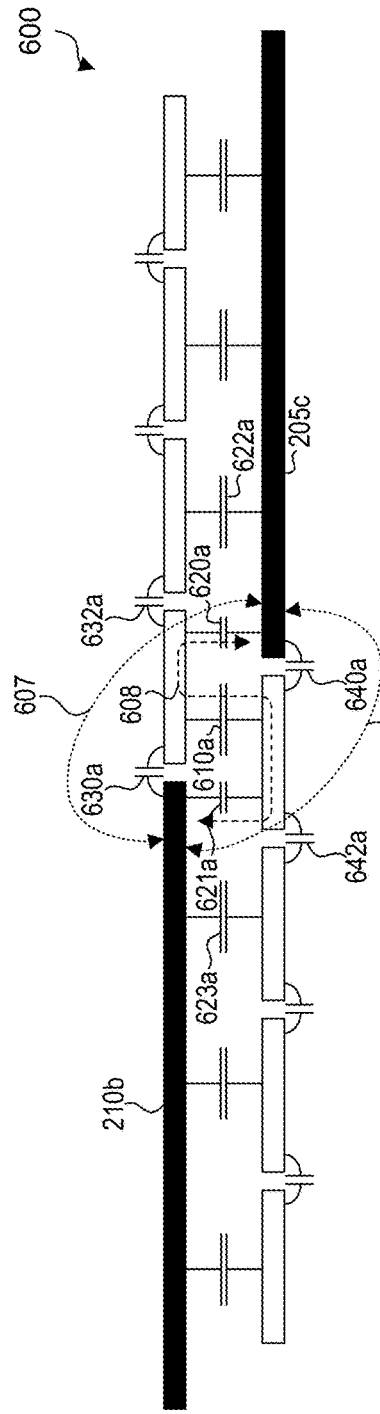
Figure 6B:
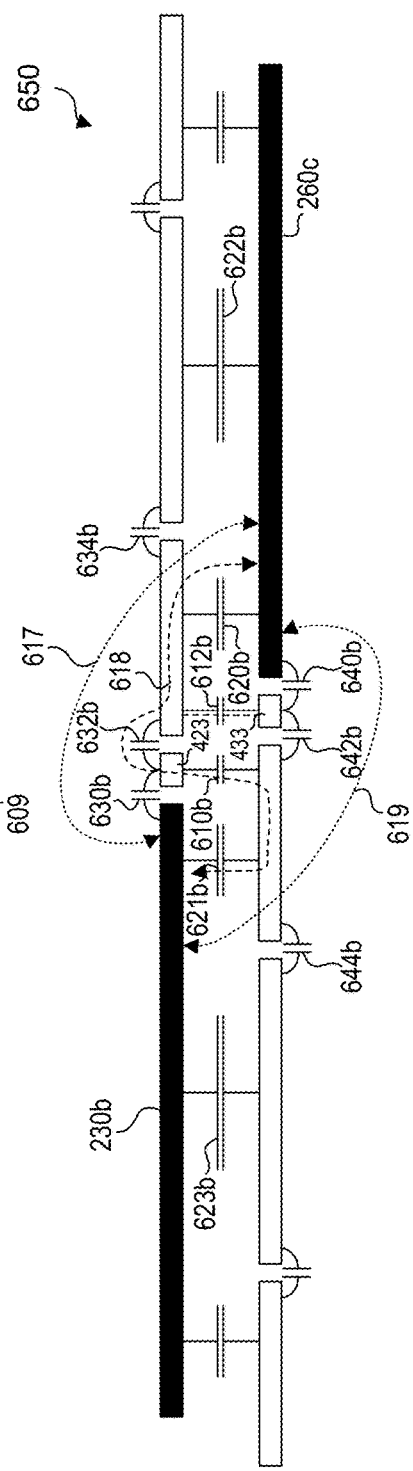
Figure 6C:
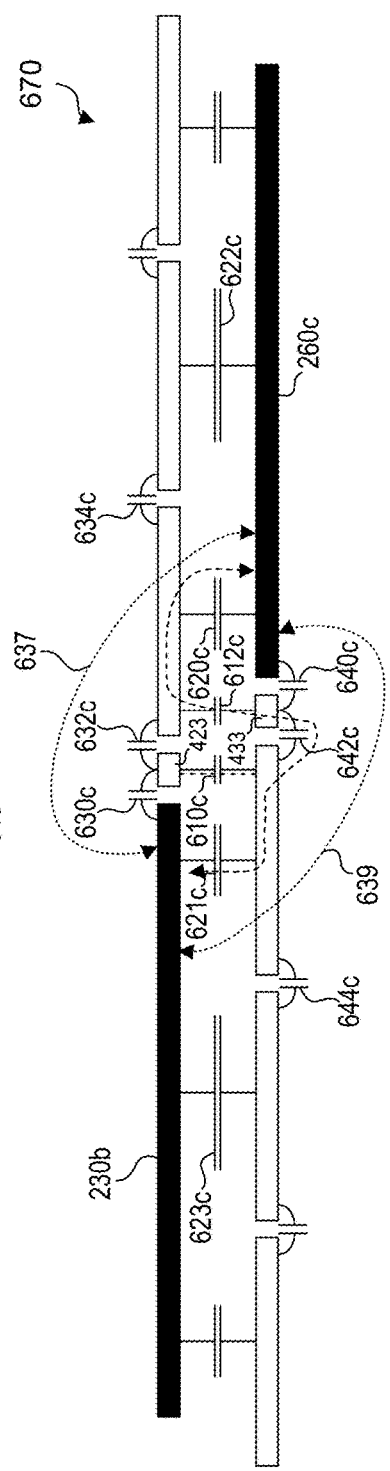
Figure 7:
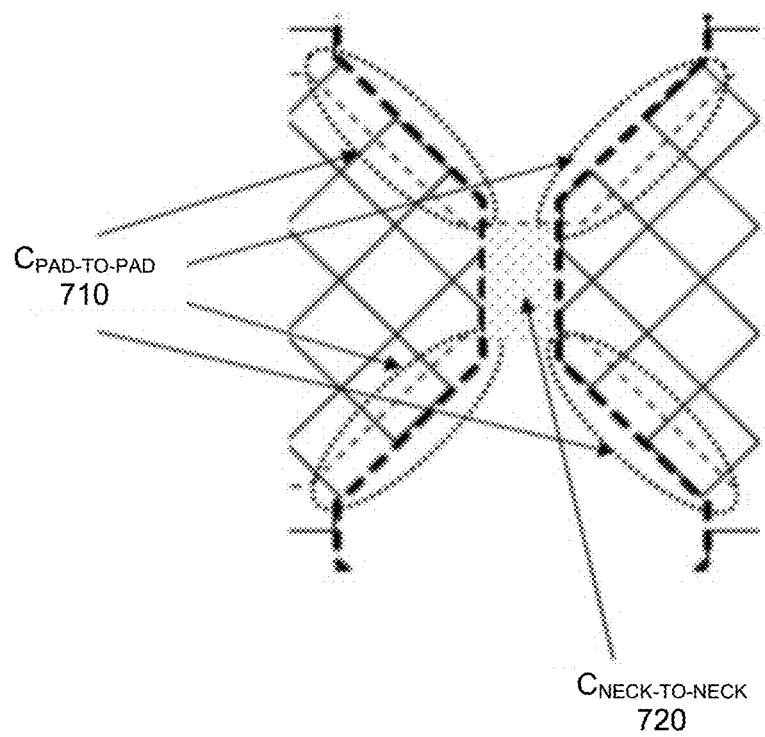
Figure 8:
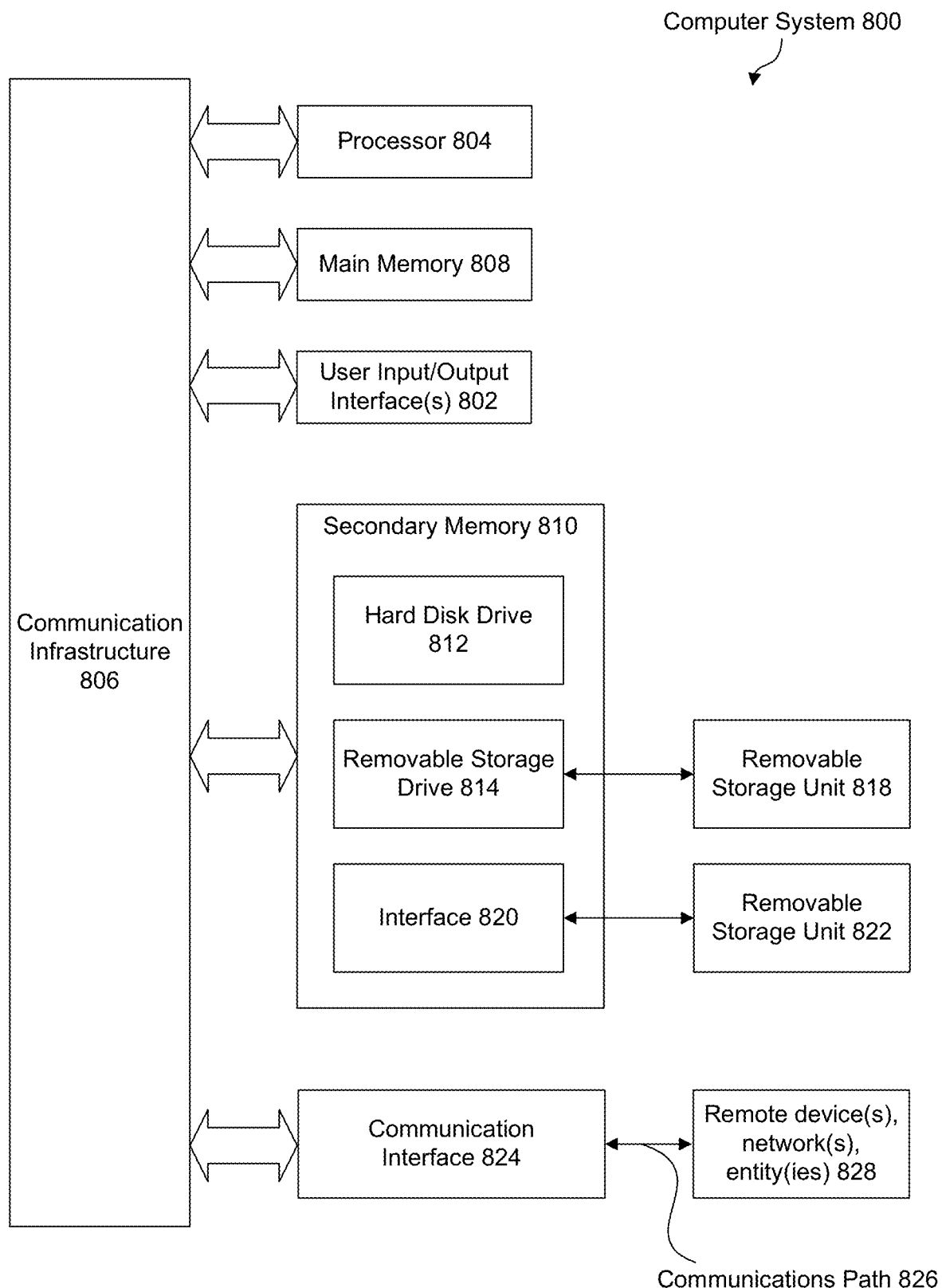

FIGS. 5C, 5D, & 5E illustrate exemplary examples of vertical cross sections of other varying ITO dicing patterns, according to an exemplary embodiments of the disclosure;

FIG. 6A illustrates an exemplary example of capacitive coupling with a uniform ITO dicing pattern;

FIG. 6B illustrates an exemplary example of capacitive coupling of a varying ITO dicing pattern, according to an exemplary embodiment of the disclosure;

FIGS. 6C, 6D, & 6E illustrate an exemplary examples of capacitive coupling of other varying ITO dicing patterns, according to an exemplary embodiments of the disclosure;

FIG. 7 illustrates an exemplary example of a plan-view overlap of a vertical electrode neck and a horizontal electrode neck, according to an exemplary embodiment of the disclosure;

FIG. 8 illustrates an example computer system useful for implementing and/or using various embodiments.

FIGS. 9A & 9B illustrate an electronic principle that for series impedances, high impedances dominate.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1A:
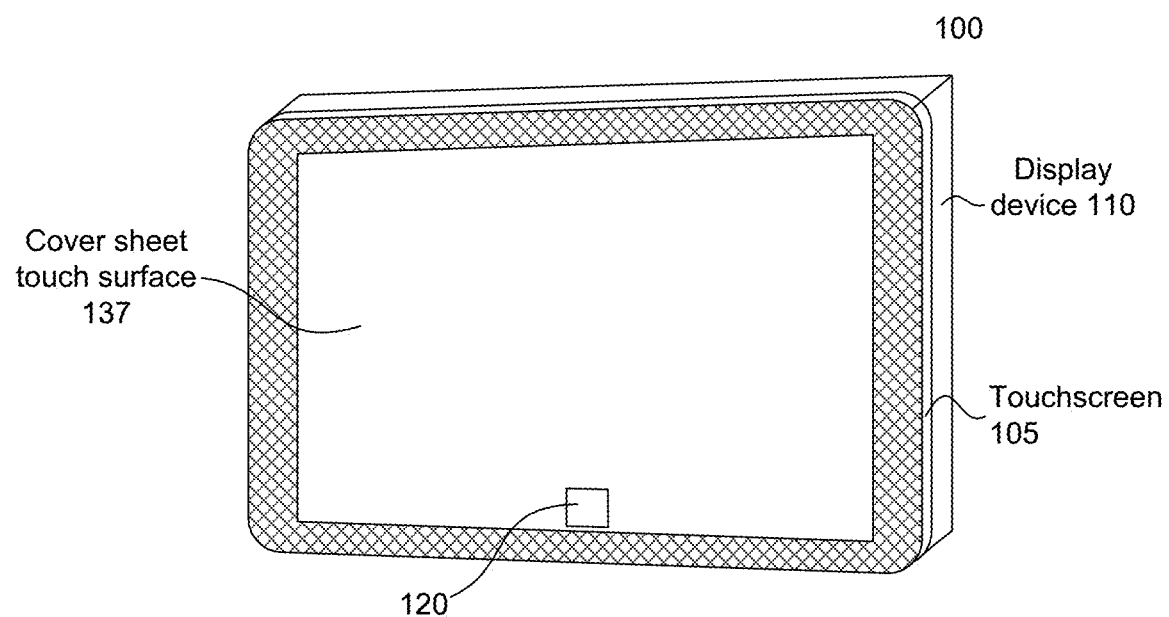
FIG. 1A illustrates a combination of a projected capacitive (PCAP) touchscreen with a display device, according to an exemplary embodiment of the disclosure.

FIG. 1A illustrates a combination 100 of a projected capacitive (PCAP) touchscreen 105 with a display device 110, according to an exemplary embodiment of the disclosure. PCAP touchscreen 105 may be placed in front of display device 110 such as a monitor, computing device, a computer, a laptop, a tablet, and/or a mobile computing device, to name just some examples. PCAP touchscreen 105 also includes a connector (not shown) that electronically couples PCAP touchscreen 105 to display device 110. A user can interact with software applications on display device 110 by touching cover sheet touch surface 137 of touchscreen 105. Cross-section 120 of PCAP touchscreen 105 is described further in FIGS. 1B and 1C.

Figure 1C:
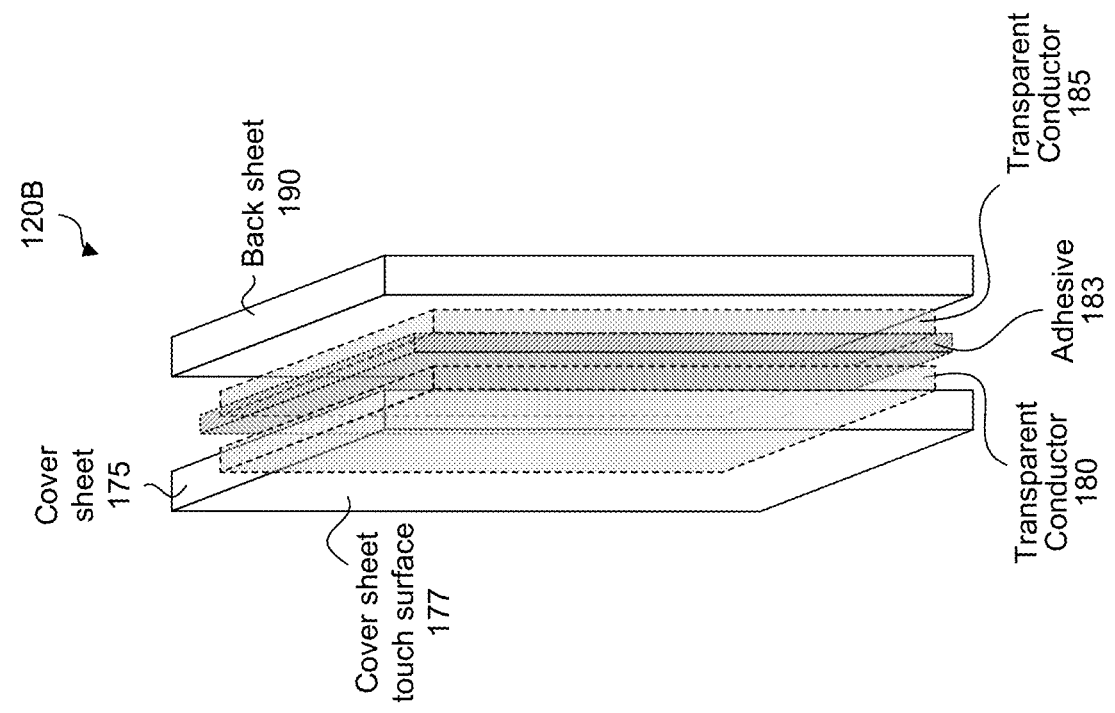
FIG. 1C illustrates a cross-section of a glass/glass PCAP touchscreen, according to an exemplary embodiment of the disclosure.
Figure 1B:
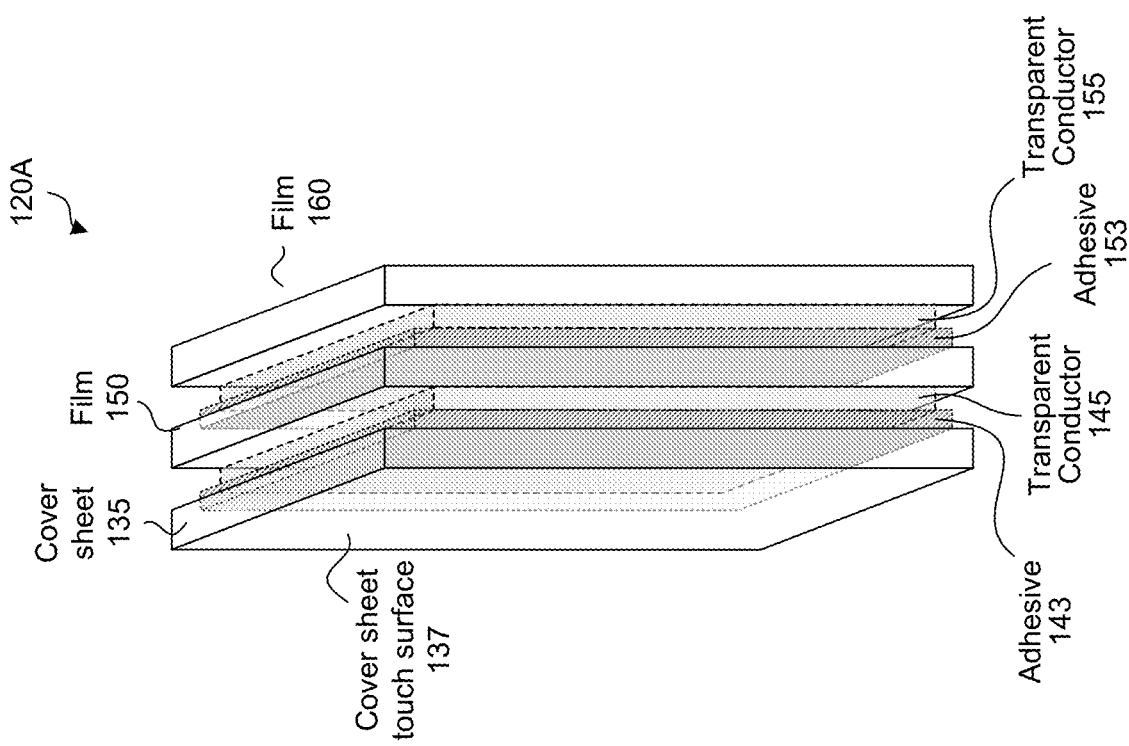
FIG. 1B illustrates a cross-section of a glass/film/film PCAP touchscreen, according to an exemplary embodiment of the disclosure.

FIG. 1B illustrates a cross-section 120A of a glass/film/film PCAP touchscreen 105, according to an exemplary embodiment of the disclosure. For explanation purposes, FIG. 1B may be described with elements from previous figures. Cross-section 120A may include cover sheet 135, adhesive 143, transparent conductor 145, film 150, adhesive 153, transparent conductor 155, and film 160. A user interacts with touchscreen 105 by touching cover sheet touch surface 137. Information from the touch on cover sheet touch surface 137 is collected via transparent conductors 145 and 155, and conveyed to display device 110 electronically.

FIG. 1C illustrates a cross-section 120B of a glass/glass (2GS) PCAP touchscreen 105, according to an exemplary embodiment of the disclosure. For explanation purposes, FIG. 1C may be described with elements from previous figures. Cross-section 120B may include cover sheet 175, transparent conductor 180, adhesive 183, transparent conductor 185, and back sheet 190. A user interacts with touchscreen 105 by touching cover sheet touch surface 177. Information from the touch on cover sheet touch surface 177 are collected via transparent conductors 180 and 185, and conveyed to display device 110 electronically. Other implementations include but are not limited to a three glass (3GS) solution in which the cover sheet contains no electrodes and there are two back sheets each with electrodes.

Adhesive layers 143, 153, and 183 may be a solid optically clear adhesive (OCA) that can be an acrylic-based adhesive, a silicone-based adhesive, polyvinyl butyral (PVB), ethylene-vinyl acetate (EVA), or any other suitable OCA that will be recognized by those skilled in the relevant art(s). Transparent conductors 145, 155, 180, and 185 are circuitry layers that may include electrodes, routing traces, and trace shields of materials such as indium-tin-oxide (ITO), carbon nanotubes, graphene, silver-nanowires, silver, and/or metal mesh. (The transparent conductors 145, 155, 180, and 185 are typically microscopically thin, but for clarity they are not drawn to scale in FIGS. 1B and 1C. Furthermore, there is no air gap between adhesives and coversheets (e.g, adhesive 143 and cover sheet 135) or adhesives and a film (e.g., adhesive 153 and film 160); adhesive 143 conforms to the inside surface of cover sheet 135 and transparent conductor 145 and adhesive 153 to film 150 and transparent conductor 155 which it turn conforms to film 160 with no air gap.

Figure 2A:
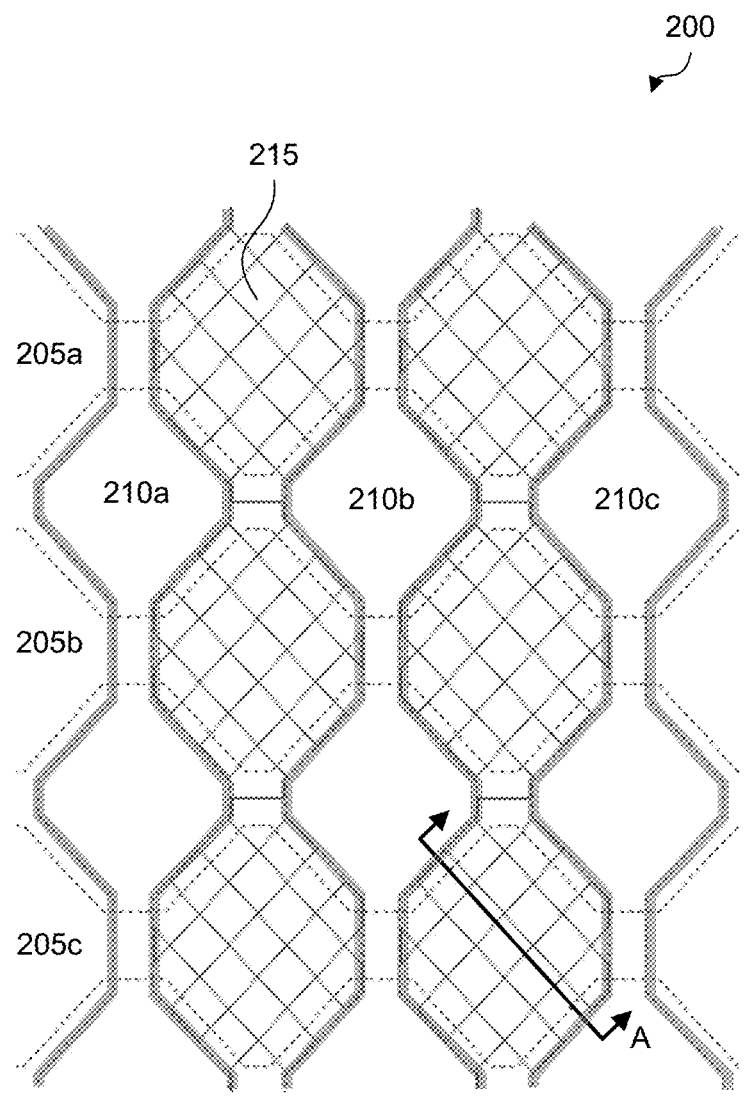
FIG. 2A illustrates a plan view of a uniform indium-tin-oxide (ITO) dicing pattern, of a PCAP touchscreen.

FIG. 2A illustrates plan view 200 of a uniform ITO dicing pattern 215, of cross-section 120A through cover sheet touch surface 137 (or cross-section 120B through cover sheet touch surface 177.) For explanation purposes, FIG. 2A may be described with elements from previous figures. Plan view 200 includes for example, vertical electrodes 210a, 210b, and 210c formed of diamond shaped "pads" connected by narrow "necks" and outlined with gray highlighted dashed lines. The vertical electrodes stand out as dominantly white areas in plan view 200. In each vertical electrode 210, three necks, two full pads and two half pads are shown. The thick shaded outlines of the vertical electrodes 210a-210c correspond to laser ablation paths on transparent conductor 145 of film 150. Horizontal electrodes 205a, 205b, and 205c are shown as dashed lines that correspond to laser ablation paths on transparent conductor 155. The necks of the horizontal electrodes 205a-205c are shown overlapping in plan-view with the necks of the vertical electrodes.

The ITO of transparent conductor 145 of film 150 is "diced up" between vertical electrodes 210a and 210b and between vertical electrodes 210b and 210c. The laser-ablation pattern for doing so is uniform ITO dicing pattern 215 represented by the fine solid lines in plan view 200. The ITO between horizontal electrodes 205a and 205b and between horizontal electrodes 205b and 205c of transparent conductor 155 on film 160 also includes a laser-ablated uniform ITO dicing pattern. However, for clarity, this is not shown in plan view 200. The uniform ITO dicing patterns (e.g., uniform ITO dicing pattern 215) creates floating ITO islands that are floating transparent conductive islands of uniform width. Furthermore, in plan-view, the dashed outlines of horizontal electrodes 205a-c of transparent conductor 155 on film 160 are well within the floating ITO islands most proximal to vertical electrodes 210a-c of transparent conductor 145 of film 150.

Uniform ITO dicing pattern 215 of plan view 200 includes sets of equally spaced parallel lines. This results in many small diamond shaped floating ITO islands of the same size. For simplicity, six uniform dicing patterns 215 are shown covering the center 6 diamond shaped pads of horizontal electrodes 205a-c. Likewise the uniform ITO dicing pattern 215 (is not shown) is present to the left of vertical electrode 210a and to the right of vertical electrode 210c. A cross section view shown by line A will be discussed with regards to FIG. 4A below.

Creating dicing patterns, rather than full removal of the ITO between electrodes, has two advantages. First, the dicing patterns reduce the total area of laser-ablated ITO, thus enabling the laser ablation process to be cost competitive. Second, the dicing patterns reduce the visibility of the electrode pattern as a large fraction of the area between electrodes has the coating of ITO just like the electrodes. In other words, the dicing patterns improve the optical uniformity of the overlapping transparent conductors 145 and 155 when viewed through cover sheet 135, for example. But, from an electronics perspective, the dicing patterns have downsides. The presence of the floating ITO islands increases the baseline capacitance ($C_M$) between vertical and horizontal electrodes resulting in increased touchscreen RC settling time, and reduced touchscreen sensitivity parameter, $\Delta C_M/C_M$. Some embodiments include a system and method for reducing these undesired electronic effects.

The baseline capacitance, $C_M$, is the background capacitance that occurs on cross-section 120A or 120B before cross-section 120A or 120B is touched. When cross-section 120A or 120B is touched, a change in the capacitance, $\Delta C_M$, is detected. A smaller base baseline capacitance, $C_M$, and a larger change in mutual capacitance, $\Delta C_M$, results in a larger value PCAP touchscreen sensitivity parameter, $\Delta C_M/C_M$. Having a larger value PCAP touchscreen sensitivity parameter, $\Delta C_M/C_M$, results in a more responsive PCAP touchscreen 105, Reducing $C_M$ also allows for larger PCAP touchscreen sizes. For example, reducing the mutual capacitance, $C_M$, associated with a touchscreen reduces the touchscreen RC settling time thus increasing the responsiveness of a PCAP touchscreen.

Figure 2B:
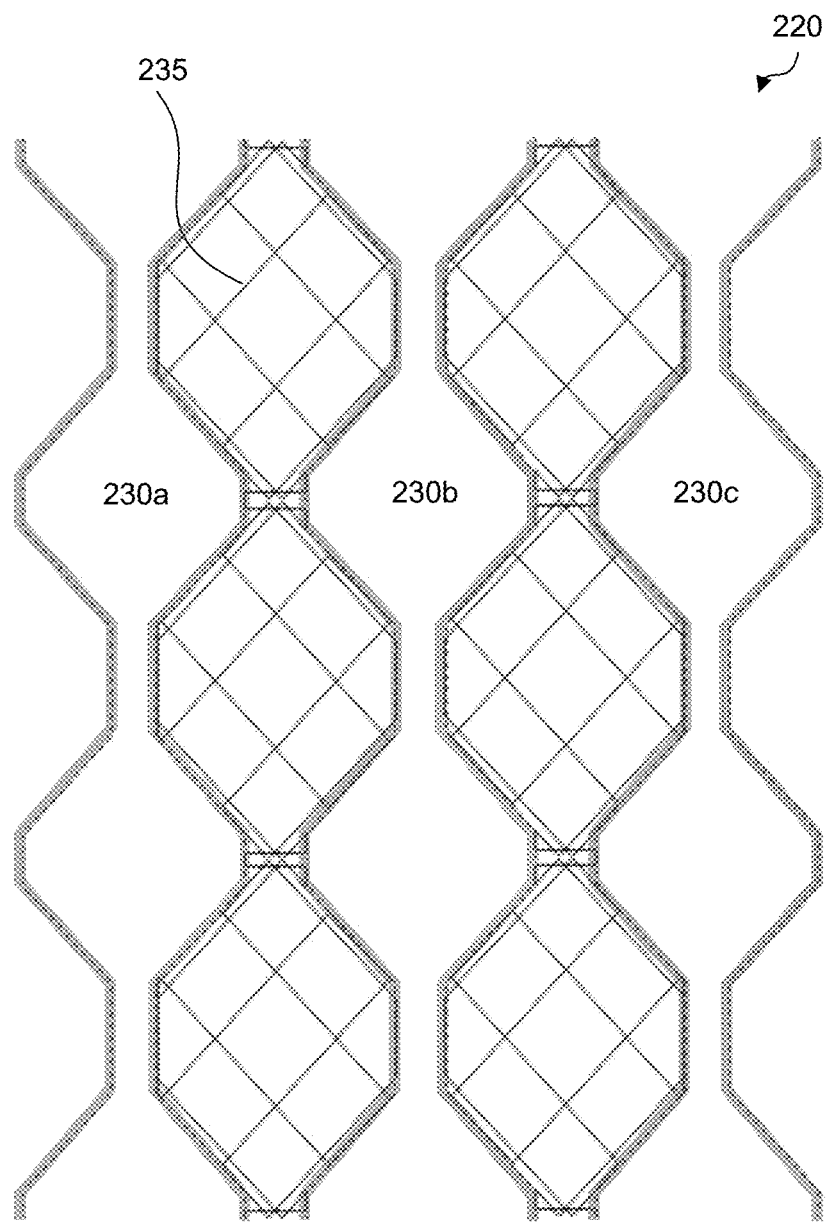
FIG. 2B illustrates a plan view of vertical electrodes with a varying ITO dicing pattern of a PCAP touchscreen, according to an exemplary embodiment of the disclosure.
Figure 2C:
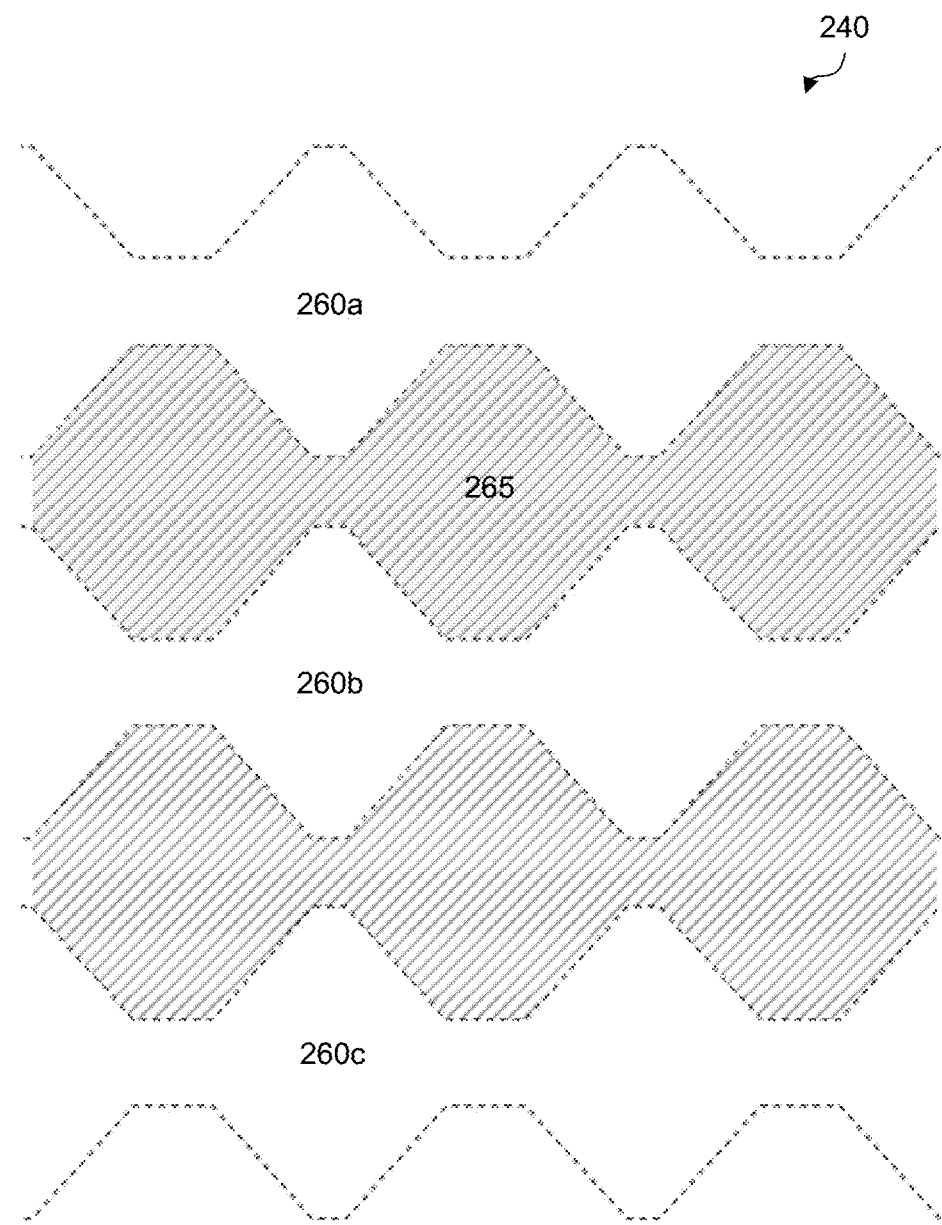
FIG. 2C illustrates a plan view of horizontal electrodes with a varying ITO dicing pattern of a PCAP touchscreen, according to an exemplary embodiment of the disclosure.
Figure 2D:
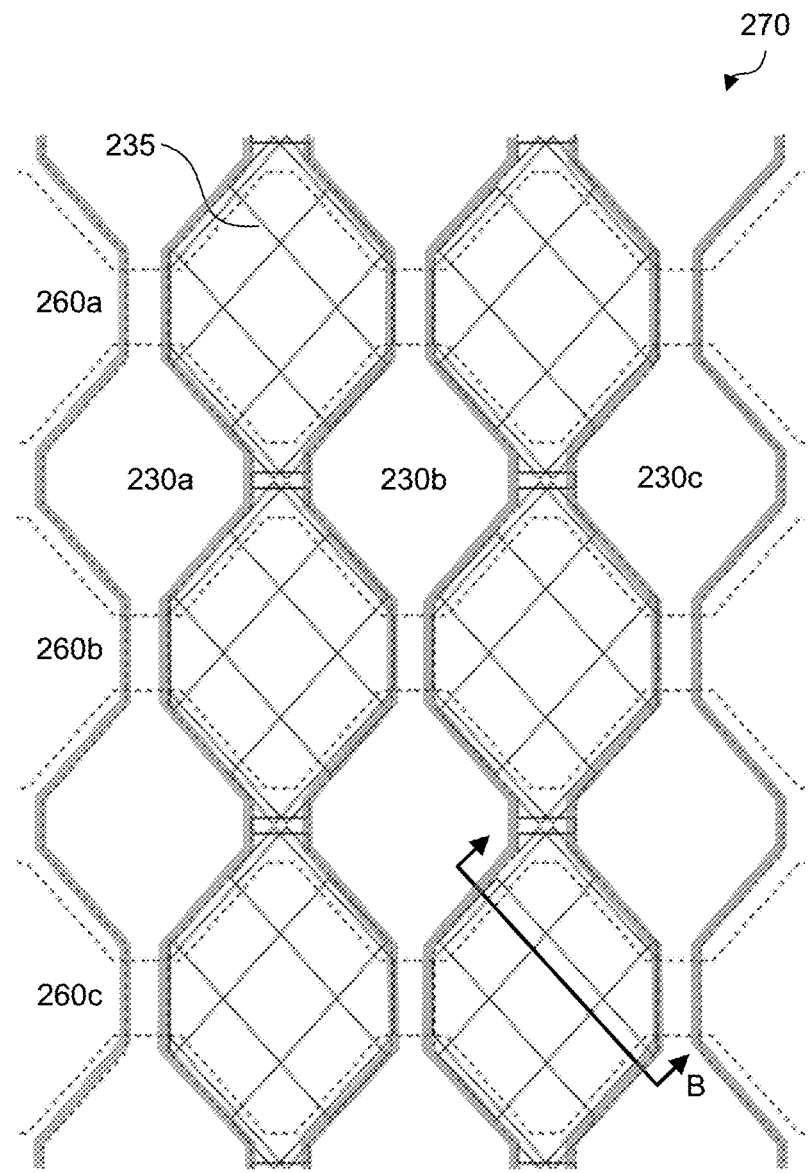
FIG. 2D illustrates a plan view of an overlay of vertical and horizontal electrodes with a varying ITO dicing pattern of a PCAP touchscreen, according to an exemplary embodiment of the disclosure.

Some embodiments include a system and method for reducing these undesired electronic effects by varying the ITO patterns of PCAP touchscreen 105. FIG. 2B overlaid onto FIG. 2C produces FIG. 2D. FIGS. 2B, 2C, and 2D may be described with elements from previous figures. FIG. 2B illustrates plan view 220 of vertical electrodes 230a-230c with a varying ITO dicing pattern 235 of PCAP touchscreen 105, according to an exemplary embodiment of the disclosure. Vertical electrodes 230a-230c may be on transparent conductor 145 of cross-section 120A of FIG. 1B, or on transparent conductor 180 of cross-section 120B of FIG. 1C. Varying ITO dicing pattern 235 of plan view 220 results in floating ITO islands of different sizes compared to the uniform ITO dicing pattern 215 of FIG. 2A that results in floating ITO islands of uniform size. Varying ITO dicing pattern 235 may include a pattern with dicing number of 5. For simplicity, six dicing patterns 235 are shown covering the center 6 diamond shaped pads of the horizontal electrodes, but dicing pattern 235 (not shown) is nevertheless present to the left of vertical electrode 230a and to the right of vertical electrode 230c.

FIG. 2C illustrates plan view 240 of horizontal electrodes 260a-260c with a varying ITO dicing pattern of a PCAP touchscreen, according to an exemplary embodiment of the disclosure. Horizontal electrodes 260a-260c may be on transparent conductor 155 of cross-section 120A of FIG. 1B, or on transparent conductor 185 of cross-section 120B of FIG. 1C. While varying ITO dicing pattern 265 of plan view 240 is shown as a shading pattern for convenience, varying ITO dicing pattern 265 results in diamond shaped floating ITO islands of different sizes compared to uniform ITO dicing pattern 215 or the uniform ITO dicing pattern (not shown) in FIG. 2A that result in uniform-sized floating ITO islands. For simplicity, six dicing patterns 265 are shown as shaded in the center 6 diamonds, but dicing pattern 265 (not shown) are present in each diamond adjacent to horizontal electrode 260a and 260c as well. Varying ITO dicing pattern 265 may be similar or different than varying ITO dicing pattern 235 of FIG. 2B.

FIG. 2D illustrates plan view 270 of an overlay of vertical electrodes 230a-230c and horizontal electrodes 260a-260c with respective varying ITO dicing patterns 235 and 265 of PCAP touchscreen 105, according to an exemplary embodiment of the disclosure. Varying ITO dicing pattern 235 on transparent conductor 145 of cross-section 120A of FIG. 1B, or on transparent conductor 180 of cross-section 170 of FIG. 1C are shown. For simplicity, varying ITO dicing pattern 265 of transparent conductor 155 of cross-section 120A of FIG. 1B, or on transparent conductor 185 of cross-section 170 of FIG. 1C are not shown. Varying ITO dicing pattern 265 would be located behind the vertical electrode pads of vertical electrodes 230a-230c.

Figure 2E:
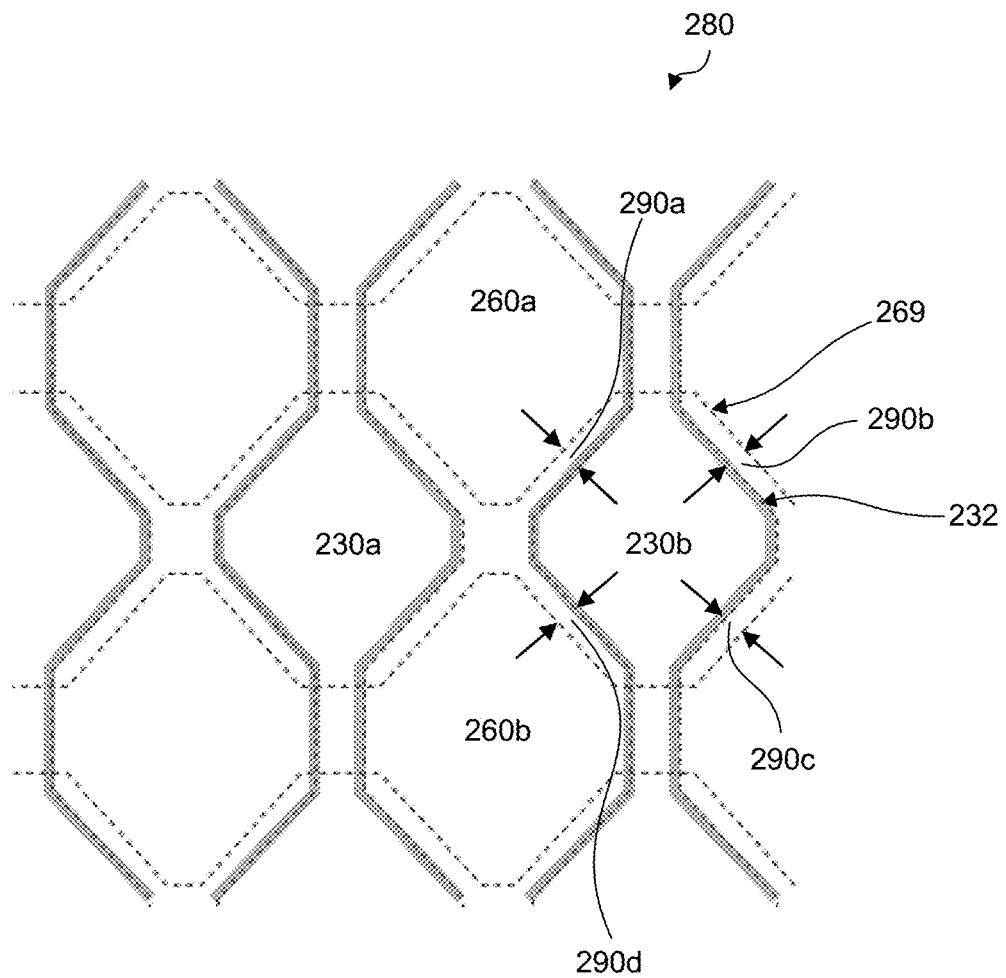
FIG. 2E illustrates a plan view of an overlay of vertical and horizontal electrodes and a plan-view electrode gap of a PCAP touchscreen, according to an exemplary embodiment of the disclosure.

FIG. 2E illustrates plan view 280 of an overlay of vertical electrodes 230a and 230b and horizontal electrodes 260a and 260b, and plan-view electrode gaps 290a-290d of PCAP touchscreen 105, according to an exemplary embodiment of the disclosure. FIG. 2E may be described with elements from previous figures. For clarity, varying ITO dicing patterns 235 and 265 are not shown. Plan-view electrode gap 290 is formed between two regions of transparent conductor formed by laser ablation, and is a distance between a vertical electrode and a horizontal electrode in a plan view. For example, plan-view electrode gap 290b is the distance between horizontal electrode ablation line 269 shown as a dashed line and vertical electrode ablation line 232 shown as a dashed line with a gray highlight.

Figure 3:
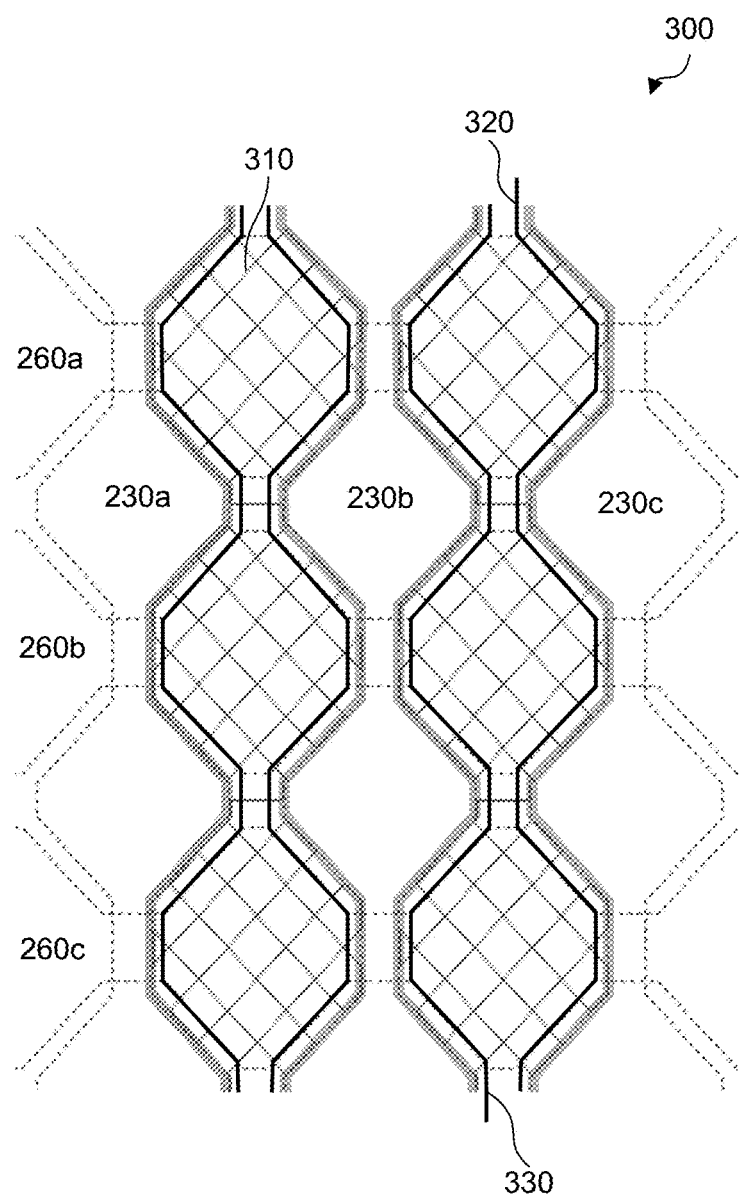
FIG. 3 illustrates a plan view of an overlay of vertical and horizontal electrodes with another varying ITO dicing pattern of a PCAP touchscreen, according to an exemplary embodiment of the disclosure.

FIG. 3 illustrates a plan view 300 of an overlay of vertical electrodes 230a and 230b and horizontal electrodes 260a and 260b with a different varying ITO dicing pattern 310 of a PCAP touchscreen, according to an exemplary embodiment of the disclosure. FIG. 3 may be described with elements from previous figures. In this example, varying ITO dicing pattern 310 may be a dicing pattern with a dicing number of 7. As shown, the dicing pattern is the same as in FIG. 2A except for the addition of laser ablation lines close to and following the outlines of the vertical electrodes. For example, laser ablation line 320 is proximate to and follows the left edge of vertical electrode 230c while laser ablation line 330 is proximate to and follows the right edge of vertical electrode 230b. A varying ITO dicing pattern (not shown) that corresponds with the transparent conductor of horizontal electrodes 260a-260b may be the same as varying ITO dicing pattern 310, 235, 265, or a different varying ITO dicing pattern.)

Figure 4A:
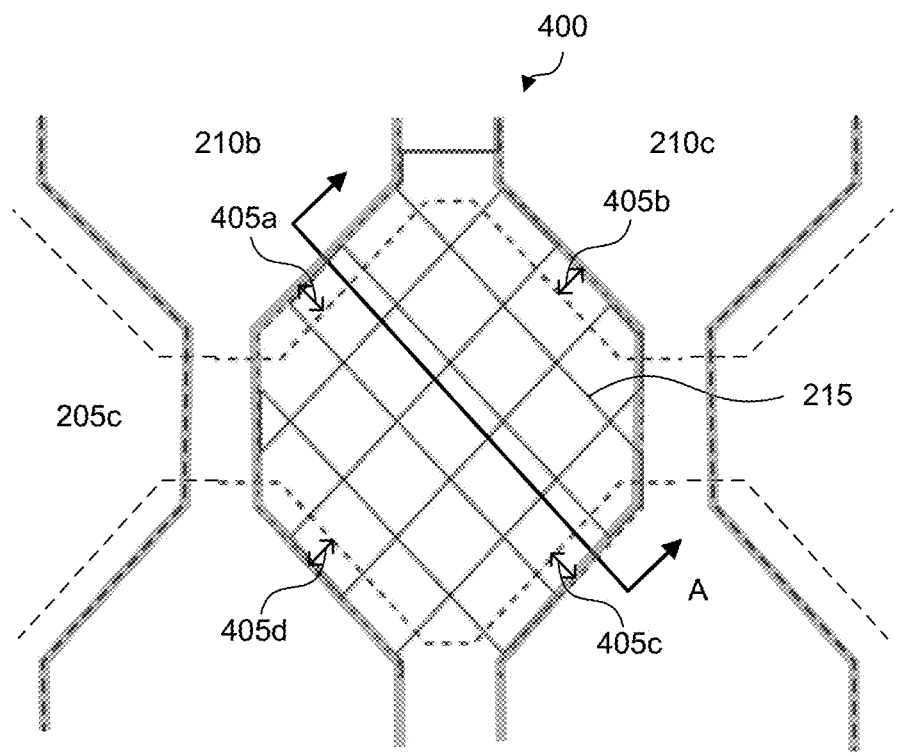
FIG. 4A illustrates an exemplary example of a plan view of a vertical cross section of a uniform ITO dicing pattern.

FIG. 4A illustrates an exemplary example of plan view 400 of a vertical cross section of uniform ITO dicing pattern 215 of FIG. 2A. FIG. 4A may be described with elements from previous figures. Plan-view electrode gaps 405a-405d are distances between the vertical electrodes 210b and 210c shown as dashed lines with a gray highlight and the horizontal electrode 205c shown as dashed lines as shown in FIG. 2A. For example, plan-view electrode gap 405a is a distance between vertical electrode 210b and horizontal electrode 205c; plan-view electrode gap 450b is a distance between vertical electrode 210c and horizontal electrode 205c; plan-view electrode gap 450c is a distance between vertical electrode 210c and horizontal electrode 205c; and plan-view electrode gap 450d is a distance between vertical electrode 210b and horizontal electrode 205c. The cross section of plan view 400 across line A is illustrated further in FIGS. 5A and 6A below.

Figure 4B:
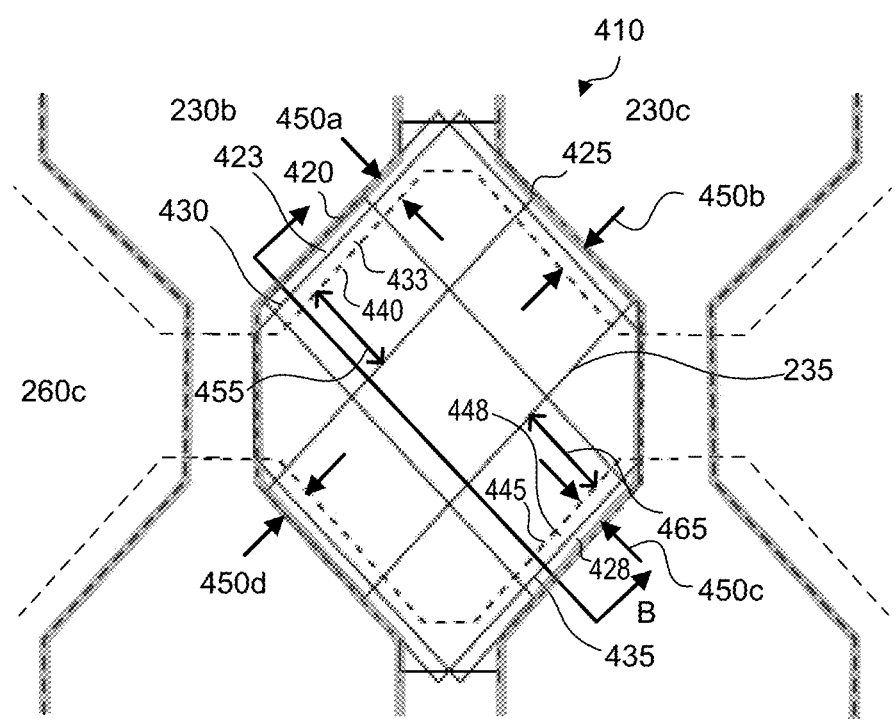
FIG. 4B illustrates an exemplary example of a plan of a view vertical cross section of a varying ITO dicing pattern, according to an exemplary embodiment of the disclosure.

FIG. 4B illustrates an exemplary example of plan view 410 of a vertical cross section of a varying ITO dicing pattern 235 of FIG. 2B, according to an exemplary embodiment of the disclosure. FIG. 4B may be described with elements from previous figures. The cross section of plan view 410 across line B is further illustrated in FIGS. 5B and 6B below. Plan-view electrode gaps 450a-450d are shown based on vertical electrode 230b and 230c and horizontal electrode 260c of FIG. 2D. Plan-view electrode gaps 450a-450d of FIG. 4B may be the same width as plan-view electrode gaps 405a-405d of FIG. 4A.

For example, plan-view electrode gap 450a is a distance between vertical electrode ablation line 420 and horizontal electrode ablation line 440; plan-view electrode gap 450b is a distance between vertical electrode ablation line 425 and horizontal electrode ablation line 440; plan-view electrode gap 450c is a distance between vertical electrode ablation line 425 and horizontal electrode ablation line 445; and plan-view electrode gap 450d is a distance between vertical electrode ablation line 420 and horizontal electrode ablation line 445.

Vertical electrode ablation line 420 is between vertical electrode 230b and most proximate floating island 423. Laser ablation line 430 is between most proximate floating island 423 and neighboring floating island 455. In addition, vertical electrode ablation line 425 is between vertical electrode 230c and most proximate floating island 428. Laser ablation line 435 is between most proximate floating island 428 and neighboring floating island 465.

Horizontal electrode ablation line 440 is between horizontal electrode 260c and most proximate floating island 433. Laser ablation line 430' is between most proximate floating island 433 and neighboring floating island 555 (see FIGS. 5B and 5C.) Further, horizontal electrode ablation line 445 is between horizontal electrode 260c and most proximate floating island 448. Laser ablation line 435' is between most proximate floating island 448 and neighboring floating island 565 (see FIGS. 5B and 5C).

In some embodiments laser ablation lines 430 and 435 are laser ablated on transparent conductor 145 of FIG. 1B (along with vertical electrodes 210a-210c) or transparent conductor 180 of FIG. 1C (along with vertical electrodes 210a-210c.) In some embodiments, laser ablation lines 430 and 435 are centered within respective plan-view electrode gaps (e.g., plan-view electrode gap 450a for laser ablation line 430 and plan-view electrode gap 450c for laser ablation line 435.) In some embodiments, one of laser ablation lines 430 and 435 is centered within their respective plan-view electrode gap and the remaining laser ablation line is not centered within their respective plan-view electrode gap.

Other laser ablation lines 430' and 435' (not shown in FIG. 4B; see FIG. 5B below) may be laser ablated on transparent conductor 155 of FIG. 1B (along with horizontal electrodes 260a-260c) or transparent conductor 185 of FIG. 1C (along with horizontal electrodes 260a-260c.) In some embodiments, laser ablation line 430' and 435' are centered within a respective plan-view electrode gap (e.g., plan-view electrode gap 450a for laser ablation line 430' and plan-view electrode gap 450c for laser ablation line 435'.) In some embodiments, one of laser ablation lines 430' and 435' is centered within their respective plan-view electrode gap 450 and the remaining laser ablation line is not centered within their respective plan-view electrode gap 450.

FIG. 5A illustrates an exemplary example of a vertical cross section 500 across line A of uniform ITO dicing pattern 215 of FIG. 2A. FIG. 5A may be described with elements from previous figures. ITO electrodes are solid black while floating islands resulting from the dicing pattern are represented as narrow open rectangles. Vertical cross section 500 includes electrodes 210b and 210c, as well as horizontal electrode 205c of FIG. 2A. Note that uniform ITO dicing pattern 215 of FIG. 2A results in uniformly sized and spaced floating ITO islands and that the uniformly sized and spaced floating ITO islands on the transparent conductor of the vertical or the horizontal electrodes are equal to or larger than plan-view electrode gaps 405a/450a or 405c/450c, where plan-view electrode gaps 450a and/or 450c may be equal to plan-view electrode gap 405a and/or 405c of FIG. 4A.

FIG. 5B illustrates an exemplary example of vertical cross section 550 across line B of varying ITO dicing pattern 235, according to an exemplary embodiment of the disclosure. FIG. 5B may be described with elements from previous figures. As described above, ITO electrodes are solid black while floating islands resulting from the dicing pattern are represented as narrow open rectangles. FIG. 5B includes vertical electrodes 230b and 230c of FIG. 2B (and FIG. 2D), and horizontal electrode 260c of FIG. 2C (and FIG. 2D). In some embodiments, varying ITO dicing pattern 235 of FIG. 2B (and FIG. 2D) results in different sized floating ITO islands on the same transparent conductor 145 or 180 as that of the vertical electrodes 230b and 230c. In some embodiments, varying ITO dicing pattern 265 of FIG. 2C (and FIG. 2D) results in different sized floating ITO islands on the transparent conductor 155 or 185 as that of the horizontal electrode 260c. In some embodiments, the dimension is width, and widths of the floating ITO islands are smaller near the boundaries between the vertical electrode pads of vertical electrodes 230b and 230c and the horizontal electrode pad of horizontal electrode 260c and larger elsewhere.

In some embodiments, a dimension of one floating ITO island of the transparent conductor of vertical electrodes 230b and 230c and/or of horizontal electrode 260c, is less than plan-view electrode gaps 450a or 450c, where plan-view electrode gaps 450a and/or 450c may be equal to plan-view electrode gap 405a and/or 405c of FIG. 4A and/or plan-view electrode gap 290a and/or 290c of FIG. 2E. In some embodiments, a dimension such as width, of one floating ITO island (e.g., most proximate floating ITO island 423 or 428) of the transparent conductor of the vertical electrodes 230b and 230c and/or a dimension of one floating ITO island (e.g., most proximate floating ITO island 433 or 448) of the horizontal electrode 260c, is less than or approximately equal to the plan-view electrode gap 450a or 450c. Again, plan-view electrode gaps 450a and/or 450c may be equal to plan-view electrode gap 405a and/or 405c of FIG. 4A, or equal to plan-view electrode gap 290a and/or 290c of FIG. 2E.

In some embodiments laser ablation lines 430 and 430' are aligned. In some embodiments laser ablation lines 430 and 430' are both centered within a plan-view electrode gap (e.g., plan-view electrode gap 450a) and they are also aligned with each other. In some embodiments laser ablation lines 435 and 435' are aligned. In some embodiments laser ablation lines 435 and 435' are both centered within a plan-view electrode gap (e.g., plan-view electrode gap 450c) and they are also aligned with each other. In some embodiments laser ablation lines 430 and 430' are both centered within a plan-view electrode gap (e.g., plan-view electrode gap 450a) and laser ablation lines 430 and 430' are also aligned with each other, and laser ablation lines 435 and 435' are both centered within a plan-view electrode gap (e.g., plan-view electrode gap 450c) and laser ablation lines 435 and 435' are also aligned with each other.

FIG. 5C illustrates an exemplary example of vertical cross section 570 of another varying ITO dicing pattern, according to an exemplary embodiment of the disclosure. Vertical cross section 570 is similar to vertical cross section 550 with regards to one or more floating ITO islands (e.g., most proximate floating ITO islands 423, 428, 433, and/or 448) being less than a plan-view electrode gap 450. But, the remaining floating islands in one or more transparent conductors associated with the vertical electrodes 230b and 230c and/or horizontal electrode 260c are equal in size.

FIG. 5D illustrates an exemplary example of vertical cross section 580 of another varying ITO dicing pattern, according to an exemplary embodiment of the disclosure. Vertical cross section 580 is similar to vertical cross section 550 except that proximate floating ITO islands 573, 578, 583 and 588 fill the plan-view electrode gap 450 rather than being more narrow than the plan-view electrode gap 450. In plan-view, vertical electrode ablation line 420 lines up with ablation line 420' between proximate floating island 583 a neighboring floating island 581. Likewise horizontal ablation line 440 lines up with ablation line 440' between proximate floating island 573 and neighboring floating island 575, and horizontal ablation line 445 lines up with ablation line 445' between proximate floating island 578 and neighboring floating island 577, and, vertical ablation line 425 lines up with ablation line 425' between proximate floating island 588 and a neighboring floating island 589.

[0061.] FIG. 5E illustrates an exemplary example of vertical cross section 590 of another varying ITO dicing pattern, according to an exemplary embodiment of the disclosure. Vertical cross section 590 is similar to vertical cross section 580 except that proximate floating islands 573, 578, 583 and 588 of cross section 580 are each split in half by additional laser ablation lines 595, 595', 596 and 596'. For vertical cross section 590, laser ablation line 595 is between proximate floating island 591A and neighboring floating island 592A. Likewise laser ablation line 595' is between proximate floating island 594A and neighboring floating island 593A, and laser ablation line 596 is between proximate floating island 592B and neighboring floating island 591B, and, laser ablation line 596' is between proximate floating island 593B and neighboring floating island 594B. In plan-view, laser ablation line 595 lines up with laser ablation line 595' and laser ablation line 596 lines up with laser ablation line 596'. It remains true that, in plan-view, laser ablation line 420 lines up with laser ablation line 420', laser ablation line 425 lines up with laser ablation line 425', laser ablation line 440 lines up with laser ablation line 440', and laser ablation line 445 lines up with laser ablation line 445'.

FIGS. 6A-6E illustrate capacitive couplings for the electrode geometries of FIGS. 5A-5E. To better appreciate FIGS. 6A-6E, keep in mind the electronic principle that for a signal path containing two or more impedances in series, the value of the total impedance of the signal path is dominated by larger of the series impedances. This principle is useful for the identification of the lowest impedance signal paths between electrodes. The lowest impedance path(s) contribute most to the mutual capacitance $C_M$ between electrodes.

A signal path may include a set of impedances in series that connect a vertical electrode to a horizontal electrode. There are many such signal paths that connect the vertical electrode to the horizontal electrode. Of the many signal paths between electrodes the signal path with the lowest impedance is most important in the sense of contributing most to $C_M$. This reflects the fact that electricity, like water, tends to follow the path of least resistance. This leaves the problem of identifying the path of least resistance, i.e. the signal path or paths with the lowest impedances.

To identify the signal path(s) of lowest impedance we need to consider the total impedance of each signal path one at a time. For this step the principle illustrated by FIGS. 9A and 9B, shows that the value of total or net impedance of a set of impedances in series is dominated by the largest impedance(s) in the path. An analogy here is that the maximum amount of traffic a road system can handle is determined by the traffic bottlenecks (e.g., high impedances to traffic), not sections of road with many lanes moving freely (e.g., low impedance to traffic). Thus, high impedance elements determine which signal paths have the lowest impedance.

FIGS. 9A & 9B illustrate the electronic principle that for a series of impedances containing higher and lower impedances, the higher impedances dominate the resulting net or total impedance. To start with the more familiar, it helps to first consider example 900 of FIG. 9A regarding resistors as a warm-up to considering series capacitors. Series resistor chain 910 includes a 10Ω resistor "R1" in series with a 1Ω resistor "R2". The total series resistance "$R_{SERIES}$" equals 11Ω, which is only 10% different from the R1 resistance of 100 but an order of magnitude different from the R2 resistance of 1Ω. The higher resistance R1 dominates the series resistance $R_{SERIES}$. The resistor chain 920 with only R1 has approximately the same resistance as the series resistor chain 910 with both R1 and R2. The effect of R2 is negligible. Similar principles apply to example 950 of FIG. 9B with series capacitor chains 930 and 940, except that the reactive impedance of capacitors plays the role of resistance. In this example, capacitor C1 has a smaller capacitance of 1 pF and capacitor C2 has larger capacitance of 10 pF. Smaller capacitance means bigger impedance, as made clear by the electronics formula for $|Z|=1/(2\pi f C)$ where C is capacitance, f is frequency, and $|Z|$ is the magnitude of impedance. For example, at a frequency of 10 kHz, C1 has a relatively large impedance of 16 MΩ and C2 has a relatively small impedance of 1.6 MΩ. The series capacitance of C1 and C2 is equal to $C_{SERIES}=0.9$ pF, for an impedance of 18 MΩ, which is only 10% different from the 1 pF capacitance (16 MΩ impedance) of the high impedance C1 and an order of magnitude different from the 10 pF capacitance of the low impedance C2. In series chains of capacitors, the dominant effects come from higher impedance capacitors, that is the series capacitors with the smaller values of capacitance.

As described earlier, capacitive coupling exists between adjacent ITO regions, including between floating ITO islands and electrode pads (vertical and horizontal.) For example, an ITO region in an upper film (e.g., transparent conductor 145 of film 150) and an ITO region in the lower film (e.g., transparent conductor 155 of film 160) that overlap in plan-view create a parallel plate capacitor. The capacitance of a parallel plate capacitor is given approximately (neglecting fringe fields) by the formula $C=\varepsilon A/d$ where A is the area of overlap of a vertical electrode pad and a horizontal electrode pad, d is the distance between the vertical electrode pad and the horizontal electrode pad, and $\varepsilon$ is the dielectric constant of the material between the ITO layers. Such "parallel-plate" capacitances are represented in FIGS. 6A-6E below by capacitor symbols with horizontal plates. There is also a capacitive coupling between neighboring ITO regions within the same transparent conductor. Such "edge-to-edge" capacitances are represented by capacitor symbols with vertical plates. Electrodes in actual capacitor circuit components are parallel rather than edge-to-edge. Edge-to-edge capacitances (in units of pF) tend to be much smaller than the parallel-plate capacitances and thus edge-to-edge capacitances tend to have much higher impedances than parallel-plate capacitances. Accordingly, the edge-to-edge capacitances represent greater barriers to transient signal propagation compared to the parallel-plate capacitances. An exception is the case in which the area "A" of a parallel plate capacitor is very small, for example if the width of area "A" is comparable to or smaller than the distance "d" between the parallel plate electrodes. In FIGS. 6B-6C and FIG. 6E the possibility of such exceptional parallel plate capacitors are indicated by vertical dotted lines rather than solid lines leaving the parallel plates symbol of the capacitance. Such parallel plate capacitors of exceptionally small capacitance, may be regarded as high impedance capacitances just like the edge-to-edge capacitances.

The formula Q=CV applies to PCAP touchscreen 105 where C is the capacitance coupling between electrodes, V is the drive voltage applied, and Q represents the charge detected at the sensing (e.g., receiving) electronics. In this context, this formula may be rewritten as $Q_{SENSE}=C_M V_{DRIVE}$ where $Q_{SENSE}$ is the integrated charge detected by the receiving electronics, $C_M$ is the mutual capacitance between drive and sense electrodes, and $V_{DRIVE}$ is the excitation voltage on the drive electrode. In electrode designs including floating islands, such as in FIGS. 5A-5E, the measured mutual capacitance $C_M$ is the net effect of a complex network of capacitances between the various regions of ITO. FIGS. 6A-6E illustrate such complex networks of capacitances. To understand the connection between such complex networks of capacitances and the resulting measurement mutual capacitance $C_M$, it helps to keep in mind that the smaller edge-to-edge and very narrow parallel-plate capacitances dominate the impedance of series capacitance chains. As discussed below, more high-impedance edge-to-edge and small-area capacitances in series means more impedance which means less mutual capacitance $C_M$ between the vertical and horizontal electrodes. Reduced $C_M$ correlates to a smaller RC time constant allowing the touchscreen to keep up with a faster drive frequency (e.g., drive voltage) and hence faster and/or more accurate data collection. Reduced $C_M$ also means greater $\Delta C_M/C_M$ for better touch sensitivity.

In FIGS. 6A-6E, the dotted arrow lines represent transient signal paths with lower "impedance." The lower-impedance transient signal paths involve fewer high-impedance edge-to-edge or small-area parallel-place capacitances. The lowest-impedance transient signal path involves the least number of high-impedance edge-to-edge or small-area capacitances. In example 600 of FIG. 6A there is one signal path that avoids high-impedance capacitances. This signal path 608 from vertical electrode 210b to horizontal electrode 205c goes through parallel plate capacitances 621a, 610a and 620a. This low-impedance signal path dominates the mutual capacitance $C_M$ between vertical electrode 201b and horizontal electrode 205c. Here, dominates means that signal path 608 is transmits more signal than the other possible paths. The result is a larger value of $C_M$ that undesirably increases the touchscreens RC settling time as well as undesirably reduces the touch sensitivity $\Delta C_M/C_M$. Alternate signal paths such as signal paths 607 and 609 contribute much less to the value of $C_M$. Signal path 607 includes high-impedance edge-to-edge capacitance 630a (and low-impedance parallel plate capacitance 620a) and signal path 609 includes high-impedance edge-to-edge capacitance 640a (and low-impedance parallel plate capacitance 621a). Hence they both include one edge-edge capacitance instead of none, so signal path 608 dominates. Signal path 608 also dominates any signal path through capacitance 622a (623a) as such paths between electrodes include high-impedance edge-to-edge capacitance 632a (642a). Relative to the electrode design of FIG. 6A, the electrode designs of FIGS. 6B-6E reduce the value of $C_M$ leading to desirable reductions in the touchscreens RC settling time as well as desirable increases in the touch sensitivity $\Delta C_M/C_M$.

For the improved designs in FIGS. 6B-6E, the lowest-impedance signal paths include at least one high-impedance edge-to-edge or small-area capacitance. In FIGS. 6B-6D, the lowest-impedance signal paths include two high-impedance capacitances. FIG. 6B illustrates an exemplary example 650 of capacitive coupling with varying ITO dicing pattern 235 and/or varying ITO dicing pattern 265, according to an exemplary embodiment of the disclosure. In example 650 of FIG. 6B there are four signal paths including two high-impedance capacitances. Signal path 617 includes edge-to-edge capacitances 630b and 632b (and low-impedance capacitance 620b). Similarly signal path 691 includes edge-to-edge capacitances 640b and 642b (and low-impedance capacitance 621b). Signal path 618 includes high-impedance small-area capacitance 610b and high-impedance edge-to-edge capacitance 632b (and low-impedance capacitances 620b and 621b); not shown is a similar path through high-impedance small-area capacitance 612b and high-impedance edge-to-edge capacitance 642b (and low-impedance capacitors 620b and 621b). Signal paths through capacitance 622b (623b) include a third high-impedance capacitance 634b (644b) and hence contribute less to $C_M$. As the design of FIG. 6B has at least two high-impedances in signal paths between the electrodes, compared to no high-impedances in the lowest impedance path 608 of FIG. 6A, the design of FIG. 6B provides an improved design with a desired lower value mutual capacitance CM between electrodes 201b and 205c. The same conclusion applies to example 670 of FIG. 6C as can be seen by repeating the above arguments with signal paths 637, 368 and 369 replacing signal paths 617, 618 and 619 respectively as well as replacing capacitances 610b, 612b, 620b, 621b, 622b, 623b, 630b, 632b, 634b, 640b, 642b, 644b with capacitances 610c, 612c, 620c, 621c, 622c, 623c, 630c, 632c, 634c, 640c, 642c, 644c respectively in example 650 of FIG. 6B.

FIG. 6D illustrates an exemplary example 680 of capacitive coupling with varying ITO dicing pattern 235 and/or varying ITO dicing pattern 265, according to an exemplary embodiment of the disclosure. In example 680, there are no signal paths between the vertical electrode pads (e.g., vertical electrode pad of vertical electrode 230b) and horizontal electrode pads (e.g., horizontal electrode pad of horizontal electrode 260c) involving zero or only one high-impedance edge-to-edge (or small area) capacitance. The dominant source of capacitive coupling between horizontal and vertical pads is expected to come from the lowest-impedance transient signal paths 647, 648 and 649 that involve two high-impedance edge-to-edge capacitances in series (e.g., 630d and 632d; or 632d and 642d; or 640d and 642d.) Hence, varying ITO dicing pattern (e.g., 235 or 265) reduces baseline $C_M$ contributions from pad-to-pad capacitive coupling (e.g., a pad of vertical electrode 230b to a pad of horizontal electrode 260c capacitive coupling.) Other capacitive-coupling signal paths involve three or more high-impedance edge-to-edge capacitances. For example, other capacitive-coupling signal paths include: i) edge-to-edge capacitances 630d, 632d, 634d, and parallel-plate capacitance 622d; and ii) edge-to-edge capacitances 640d, 642d, 644d and parallel-plate capacitance 623d. Signal paths 647, 649 and 648 also include capacitances 620d, 621d, or 611d, 620d, and 621d respectively, but these are larger parallel-plate capacitances that are dominated by the higher-impedance capacitances. Thus, the transient signal paths 647, 648 and 649 indicated by the dotted lines are the lowest-impedance signal paths and they dominate (e.g., transmit more signal) capacitive coupling between the electrode pads 230b and 260c.

FIG. 6E illustrates an exemplary example 690 of capacitive coupling with varying ITO dicing pattern 235 and/or varying ITO dicing pattern 265, according to an exemplary embodiment of the disclosure. In example 690, there are no signal paths between the vertical electrode pads (e.g., vertical electrode pad of vertical electrode 230b) and horizontal electrode pads (e.g., horizontal electrode pad of horizontal electrode 260c) involving zero, only one, or even only two high-impedance edge-to-edge (or small area) capacitances. The dominant source of capacitive coupling between horizontal and vertical pads is expected to come from the two lowest-impedance transient signal paths 657 and 659 that involve three high-impedance edge-to-edge capacitances in series, namely 630e, 632e and 633e, or 640e, 642e and 643e respectively. Signal paths 657 and 659 also include capacitances 620e and 621e respectively, but these are larger parallel-plate capacitances that are dominated by the higher-impedance capacitances. Signal path 658 is relatively less important because it includes one high-impedance small-area capacitance 610e in addition to three high-impedance edge-to-edge capacitances 643e, 632e and 633e. Likewise, any signal path through high-impedance small-area capacitance 612e will include at least four high-impedance capacitances. Other capacitive-coupling signal paths involve four or more high-impedance edge-to-edge capacitances. For example, other capacitive-coupling signal paths include: i) edge-to-edge capacitances 630e, 632e, 633e, 634e, and parallel-plate capacitance 622e; and ii) edge-to-edge capacitances 640e, 642e, 643e, 644e and parallel-plate capacitance 623e. Hence, example 690 of FIG. 6E is another example of a varying ITO dicing pattern (e.g., 235 or 265) that reduces baseline $C_M$ contributions from pad-to-pad capacitive coupling (e.g., vertical electrode pad 230b to horizontal electrode pad 260c capacitive coupling.)

In addition, a varying ITO dicing pattern (e.g., 235, 265) not only decreases $C_M$, but may also increase $\Delta C_M$. In some cases, the varying ITO dicing pattern may increase the number of electric field lines reaching the cover sheet touch surface 137 or cover sheet touch surface 177 compared to uniform ITO dicing pattern 215. If so, a touch on cover sheet touch surface 137 or cover sheet touch surface 177 results in a larger $\Delta C_M$.

By reducing $C_M$ and perhaps increasing $\Delta C_M$, the PCAP touchscreen sensitivity ratio, $\Delta C_M/C_M$, is increased. Furthermore, reducing $C_M$ reduces the RC time constant associated with the PCAP touchscreen. These improvements in touchscreen electronic parameters promise improved touch sensitivity and/or increased maximum touchscreen size.

Referring to FIGS. 5B-5E and 6B-6E, it may be noted that whenever ablation lines line up in plan-view, the signal path is forced to go through a high-impedance edge-to-edge capacitance. This makes plan-view aligned ablation lines, like 430 and 430', 435 and 435', 440 and 440', 445 and 445', 595 and 959', and 596 and 596' a desirable feature of these designs.

FIG. 7 illustrates an exemplary example of a plan-view overlap 700 of a vertical electrode neck and a horizontal electrode neck, according to an exemplary embodiment of the disclosure. The overlap of the necks (lightly shaded) creates a parallel-plate capacitance $C_{NECK\text{-}TO\text{-}NECK}$ that may be referred to as the "neck-to-neck capacitance." In contrast, "pad-to-pad capacitance" and the symbol $C_{PAD\text{-}TO\text{-}PAD}$ 710 describe the capacitances in the above embodiments. The lightly dotted ellipses in the drawing below indicate the regions associated with the pad-to-pad capacitance, $C_{PAD\text{-}TO\text{-}PAD}$ 710. If the pad-to-pad capacitance, $C_{PAD\text{-}TO\text{-}PAD}$ 710, is large compared to the neck-to-neck capacitance, $C_{NECK\text{-}TO\text{-}NECK}$ 720, then the benefits of varying ITO dicing pattern will have a significant percentage effect on baseline $C_M$ values. In contrast, if the neck-to-neck capacitance, $C_{NECK\text{-}TO\text{-}NECK}$ 720, is large compared to the pad-to-pad capacitance $C_{PAD\text{-}TO\text{-}PAD}$ 710, then the varying dicing pattern may have less effect on baseline $C_M$ values. However, even if $C_{NECK\text{-}TO\text{-}NECK}$ 720$\gg C_{PAD\text{-}TO\text{-}PAD}$ 710, the varying ITO dicing pattern may still have a significant effect on touch sensitivity $\Delta C_M/C_M$ due to an increase in $\Delta C_M$.

Various embodiments can be implemented, for example, using one or more well-known computer systems, such as computer system 800 shown in FIG. 8. Computer system 800 can be any well-known computer capable of performing the functions described herein such as PCAP touchscreen 105 of FIG. 1 and/or display device 110. Computer system 800 may be internal or external to PCAP touchscreen 105 and/or display device 110 as discussed above. For example, portions of computer system 800 may be included as PCAP touchscreen 105 and/or display device 110. In addition, PCAP touchscreen 105 may be used in conjunction with another computer system 800.

Computer system 800 includes one or more processors (also called central processing units, or CPUs), such as a processor 804. Processor 804 is connected to a communication infrastructure or bus 906. One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 900 also includes user input/output device(s) such as monitors, keyboards, pointing devices, etc., that communicate with communication infrastructure 806 through user input/output interface(s) 802.

Computer system 800 also includes a main or primary memory 808, such as random access memory (RAM). Main memory 908 may include one or more levels of cache. Main memory 808 has stored therein control logic (i.e., computer software) and/or data. Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired, and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A projected capacitive (PCAP) touchscreen, comprising:
    a first transparent electrode comprising a vertical electrode pad and a first floating indium-tin-oxide (ITO) island; and
    a second transparent electrode parallel to the first transparent electrode, comprising a horizontal electrode pad and a second floating ITO island,
    wherein the vertical electrode pad is separated from the horizontal electrode pad by a plan-view electrode gap, wherein a dimension of the first floating ITO island is less than or equal to the plan-view electrode gap,
    wherein the first transparent electrode comprises a first laser ablation line between the first floating ITO island and a third floating ITO island of the first transparent electrode, wherein the third floating ITO island is most proximate to the first floating ITO island; and
    wherein the second transparent electrode comprises a second laser ablation line between the second floating ITO island and a fourth floating ITO island of the second transparent electrode, wherein the fourth floating ITO island is most proximate to the second floating ITO island.

2. The PCAP touchscreen of claim 1, wherein the first laser ablation line and the second laser ablation line are centered within the plan-view electrode gap.

3. The PCAP touchscreen of claim 1, wherein the first laser ablation line is not aligned with the second laser ablation line within the plan-view electrode gap.

4. The PCAP touchscreen of claim 1, wherein the first floating ITO island is smaller than one or more floating ITO islands of the first transparent electrode.

5. The PCAP touchscreen of claim 4, wherein the one or more floating ITO islands of the first transparent electrode vary in length.

6. The PCAP touchscreen of claim 4, wherein the one or more floating ITO islands of the first transparent electrode are substantially equivalent in length.

7. The PCAP touchscreen of claim 1, wherein the dimension of the first floating ITO island is based on a varying ITO dicing pattern, the PCAP touchscreen further comprising:
    a first signal path from the vertical electrode pad to the horizontal electrode pad via the first floating ITO island, wherein the first signal path comprises at least one high-impedance edge-to-edge capacitance or one high-impedance small-area capacitance, wherein the first signal path has a lower impedance than a fifth signal path from the vertical electrode pad to the horizontal electrode pad via a fifth floating ITO island of the first transparent electrode, wherein the fifth floating ITO island is based on a uniform ITO dicing pattern.

8. The PCAP touchscreen of claim 7, wherein the varying ITO dicing pattern causes a reduction in a value of mutual capacitance, CM, between the vertical electrode pad and the horizontal electrode pad.

9. The PCAP touchscreen of claim 7, wherein the varying ITO dicing pattern causes a reduction in an RC settling time of the PCAP touchscreen and an increase in touch sensitivity, $\Delta C_M/C_M$.

10. The PCAP touchscreen of claim 1, wherein a combination of the dimension of the first floating ITO island and a dimension of the third floating ITO island is less than or equal to the plan-view electrode gap.

11. The PCAP touchscreen of claim 10, wherein the dimensions of the first and third floating ITO islands are equal.

12. A method for fabricating a projected capacitive (PCAP) touchscreen, comprising:
    disposing on a first layer, a first transparent electrode comprising a vertical electrode pad;
    disposing on a second layer, a second transparent electrode parallel to the first transparent electrode, comprising a horizontal electrode pad, wherein the vertical electrode pad is separated from the horizontal electrode pad by a plan-view electrode gap; and
    creating via laser ablation, a first floating indium-tin-oxide (ITO) island and a third floating ITO island on the first transparent electrode, wherein a dimension of the first floating ITO island is less than or equal to the plan-view electrode gap, wherein the third floating ITO island is most proximate to the first floating ITO island; and
    creating via laser ablation, a second floating ITO island and a fourth floating ITO island on the second transparent electrode, wherein the fourth floating ITO island is most proximate to the second floating ITO island.

13. The method for fabricating the PCAP touchscreen of claim 12, wherein a first laser ablation line between the first and third floating ITO islands and a second laser ablation line between the second and fourth floating ITO islands are centered within the plan-view electrode gap.

14. The method for fabricating the PCAP touchscreen of claim 12, wherein a first laser ablation line between the first and third floating ITO islands is not aligned with a second laser ablation line between the second and fourth floating ITO islands within the plan-view electrode gap.

15. The method for fabricating the PCAP touchscreen of claim 12, wherein the first floating ITO island is smaller than one or more floating ITO islands of the first transparent electrode.

16. The method for fabricating the PCAP touchscreen of claim 15, wherein the one or more floating ITO islands of the first transparent electrode vary in length.

17. The method for fabricating the PCAP touchscreen of claim 15, wherein the one or more floating ITO islands of the first transparent electrode are substantially equivalent in length.

18. The method for fabricating the PCAP touchscreen of claim 12, wherein the dimension of the first floating ITO island is based on a varying ITO dicing pattern, the method further comprising:

creating a first signal path from the vertical electrode pad to the horizontal electrode pad via the first floating ITO island, wherein the first signal path comprises at least one high-impedance edge-to-edge capacitance or one high-impedance small-area capacitance, wherein the first signal path has a lower impedance than a second path from the vertical electrode pad to the horizontal electrode pad via a fifth floating ITO island of the first transparent electrode, wherein the fifth floating ITO island is based on a uniform ITO dicing pattern.

19. The method for fabricating the PCAP touchscreen of claim 18, wherein the varying ITO dicing pattern causes a reduction in a value of mutual capacitance, CM, between the vertical electrode pad and the horizontal electrode pad.

20. The method for fabricating the PCAP touchscreen of claim 18, wherein the varying ITO dicing pattern causes a reduction in an RC settling time of the PCAP touchscreen and an increase in touch sensitivity, $\Delta C_M/C_M$.

* * * * *

UNITED STATES PATENT AND TRADEMARK OFFICE
CERTIFICATE OF CORRECTION

PATENT NO. : 11,216,140 B2
APPLICATION NO. : 16/822719
DATED : January 4, 2022
INVENTOR(S) : Joel C. Kent Page 1 of 1

It is certified that error appears in the above-identified patent and that said Letters Patent is hereby corrected as shown below:

In the Claims

In Column 18, Line 10, replace "capacitance, CM," with --capacitance, $C_M$,--.

In Column 19, Line 13, replace "capacitance, CM," with --capacitance, $C_M$,--.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*